US011188206B2

(12) United States Patent
Omata

(10) Patent No.: US 11,188,206 B2
(45) Date of Patent: Nov. 30, 2021

(54) INFORMATION PROCESSING APPARATUS AND INFORMATION PROCESSING METHOD

(71) Applicant: SONY CORPORATION, Tokyo (JP)

(72) Inventor: Takanobu Omata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/645,825

(22) PCT Filed: Aug. 6, 2018

(86) PCT No.: PCT/JP2018/029389
§ 371 (c)(1),
(2) Date: Mar. 10, 2020

(87) PCT Pub. No.: WO2019/058788
PCT Pub. Date: Mar. 28, 2019

(65) Prior Publication Data
US 2020/0278785 A1 Sep. 3, 2020

(30) Foreign Application Priority Data

Sep. 19, 2017 (JP) .............................. JP2017-179080

(51) Int. Cl.
*G06F 3/048* (2013.01)
*G06F 3/0484* (2013.01)
(Continued)

(52) U.S. Cl.
CPC ...... *G06F 3/04845* (2013.01); *A63F 13/2145* (2014.09); *A63F 13/52* (2014.09); *G06F 3/04883* (2013.01)

(58) Field of Classification Search
CPC .............. G06F 3/04886; G06F 3/0481; G06F 3/04845; G06F 2203/04104;
(Continued)

(56) References Cited

U.S. PATENT DOCUMENTS

2003/0079218 A1* 4/2003 Goldberg ............... G06Q 10/10
725/13
2011/0078571 A1* 3/2011 Asbahr ................. A63F 13/426
715/716
(Continued)

FOREIGN PATENT DOCUMENTS

CN 103914161 A 7/2014
JP 2014-016803 A 1/2014
(Continued)

OTHER PUBLICATIONS

International Search Report and Written Opinion of PCT Application No. PCT/JP2018/029389, dated Sep. 4, 2018, 07 pages of ISRWO.

*Primary Examiner* — Alex Olshannikov
(74) *Attorney, Agent, or Firm* — Chip Law Group

(57) ABSTRACT

An information processing apparatus, an information processing method, and a program that are capable of providing a particular feedback in a displayed image in response to a predetermined operation by a plurality of users at matched timing. The information processing apparatus includes a control unit for recognizing a plurality of users, detecting operation, by each user, on a display surface where an image is being displayed, and outputting feedback on the image displayed on the display surface according to timing of detected operations by the plurality of users.

15 Claims, 20 Drawing Sheets

(51) Int. Cl.
*A63F 13/2145* (2014.01)
*A63F 13/52* (2014.01)
*G06F 3/0488* (2013.01)

(58) Field of Classification Search
CPC ............. G06F 3/04842; G06F 3/04812; G06F 3/0486; G06F 9/451; G06F 3/017; G06F 3/04883; G06F 3/0488; A63F 2300/1075; A63F 2300/8088; A63F 13/843; A63F 13/2145; A63F 13/52; A63F 13/847; A63F 13/213; A63F 13/44; G06Q 10/10; G06Q 10/06; G06Q 10/109; G06Q 10/1093; G06Q 30/0241; G06Q 30/0603; G06Q 50/16
USPC ........................................ 715/733, 750, 751

See application file for complete search history.

(56) References Cited

U.S. PATENT DOCUMENTS

| | | | |
|---|---|---|---|
| 2011/0167352 A1* | 7/2011 | Ohgishi | H04N 21/422 715/733 |
| 2014/0009418 A1 | 1/2014 | Sugimoto | |
| 2014/0192016 A1 | 7/2014 | Yoshino | |
| 2015/0254809 A1* | 9/2015 | Shibata | G06T 3/60 345/649 |
| 2016/0170489 A1* | 6/2016 | Jung | G06F 3/013 345/156 |
| 2016/0170616 A1* | 6/2016 | Rosenberg | H04L 69/24 715/753 |
| 2016/0191875 A1* | 6/2016 | Nagao | G06K 9/24 348/601 |

FOREIGN PATENT DOCUMENTS

| | | |
|---|---|---|
| JP | 2014-134938 A | 7/2014 |
| JP | 2015-090524 A | 5/2015 |
| JP | 2016-192987 A | 11/2016 |

* cited by examiner

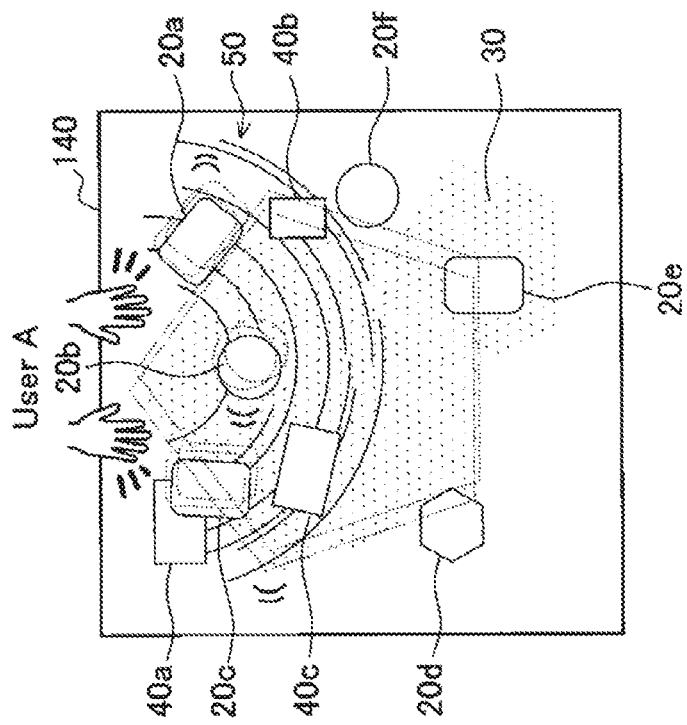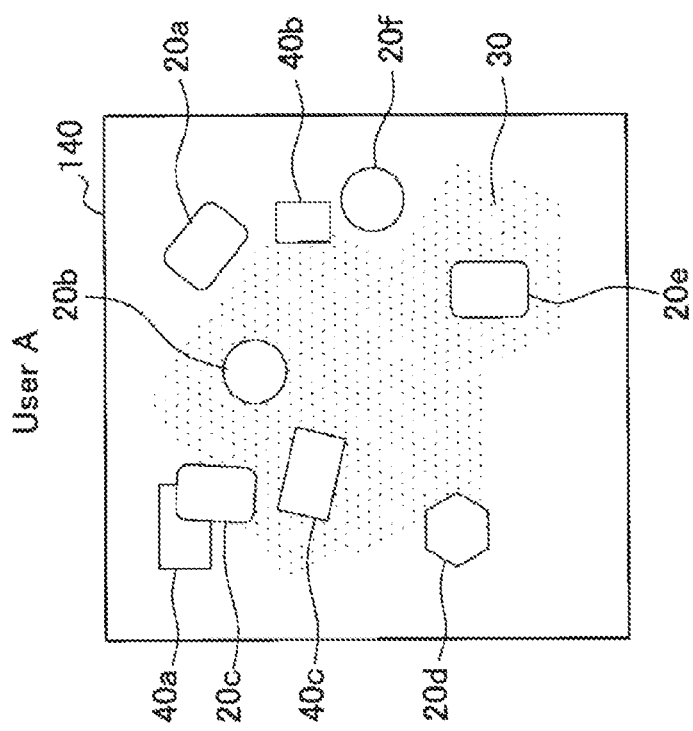
FIG.13

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/029389 filed on Aug. 6, 2018, which claims priority benefit of Japanese Patent Application No. JP 2017-179080 filed in the Japan Patent Office on Sep. 19, 2017. Each of the above-referenced applications is hereby incorporated herein by reference in its entirety.

FIELD

The present disclosure relates to an information processing apparatus, an information processing method, and a program.

BACKGROUND

In recent years, information processing apparatuses such as smartphones, tablet terminals, and digital signage have become widespread, and development related to display objects (that is, user interface: UI) in information processing apparatuses capable of such complicated processing and expression has been developed in various perspectives. For example, UIs that can be operated more intuitively by users, UIs that can easily realize complicated operations, UIs that improve user convenience, and the like have been developed. As an example, Patent Literature 1 below discloses a technique for displaying a UI on a table and realizing an interaction between the UI and the user.

CITATION LIST

Patent Literature

Patent Literature 1: JP 2015-90524 A

SUMMARY

Technical Problem

However, in such an apparatus, in general, service for a single user is provided based on the interaction with the single user. Regarding the extension to a plurality of users, the above mentioned Patent Literature 1 describes that the device may be shared by a plurality of users as an example of usage; however, specifically, each operation by a plurality of users is individually recognized as interaction and a simultaneous operation by a plurality of users is not recognized.

In the view of the above problem, the present disclosure proposes an information processing apparatus, an information processing method, and a program that can provide specific feedback in a display image in response to a predetermined operation by a plurality of users at matched timing.

Solution to Problems

According to the present disclosure, an information processing apparatus is provided that includes a control unit configured to: recognize a plurality of users; detect operation, by each user, on a display surface where an image is being displayed; and control to output feedback on the image displayed on the display surface according to timing of detected operations by the plurality of users.

According to the present disclosure, an information processing method is provided, wherein a processor executes processes comprising: recognizing a plurality of users; detecting operation, by each user, on a display surface where an image is being displayed; and outputting feedback on the image displayed on the display surface according to timing of detected operations by the plurality of users.

According to the present disclosure, a program is provided that causes a computer to function as a control unit for: recognizing a plurality of users; detecting operation, by each user, on a display surface where an image is being displayed; and outputting feedback on the image displayed on the display surface according to timing of detected operations by the plurality of users.

Advantageous Effects of Invention

As described above, according to the present disclosure, specific feedback can be provided in a display image in response to a predetermined operation by a plurality of users at matched timing.

Note that the above effect is not necessarily limited, and any of effects described in the present specification or other effects that can be understood from the present specification together with or in place of the above effects may be provided.

BRIEF DESCRIPTION OF DRAWINGS

FIG. 13 is a diagram illustrating an example of a ripple expression acting on all display objects according to the second specific example.

DESCRIPTION OF EMBODIMENTS

Hereinafter, preferred embodiments of the present disclosure will be described in detail with reference to the accompanying drawings. Note that, in this specification and drawings, components having the substantially same functional configuration, a same reference number will be used and duplicated explanation will be omitted.

The description will be made in the following order.
1. Overview of information processing system according to embodiment of the present disclosure
2. Functional configuration
3. Operation processing
4. Specific examples
4-1. First specific example
4-2. Second specific example
4-3. Third specific example
5. Hardware configuration example
6. Summary <<1. Overview of Information Processing System According to Embodiment of the Present Disclosure>>

Figure 1:
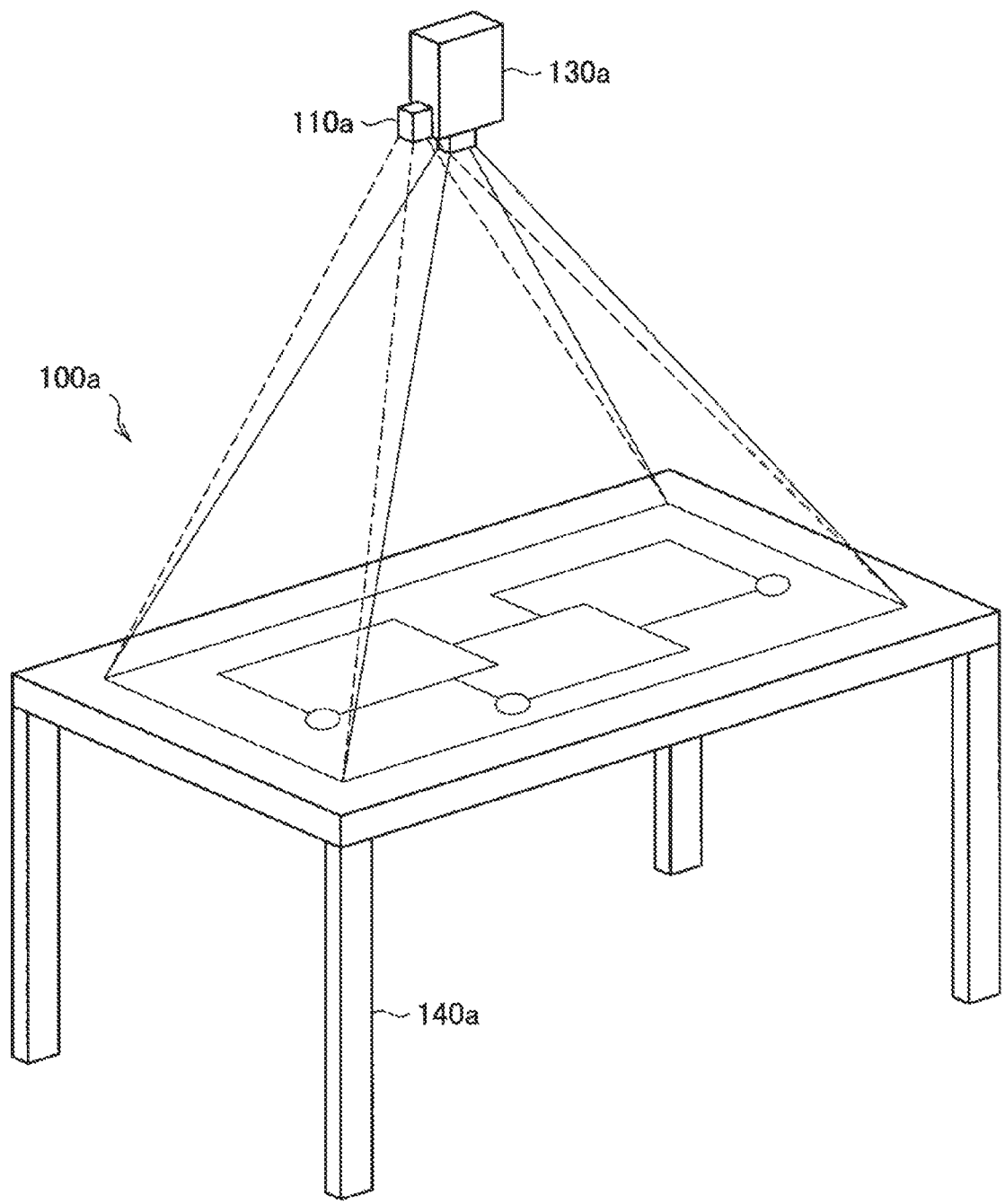
FIG. 1 is a diagram illustrating a configuration example of an information processing system according to an embodiment of the present disclosure.

A configuration of an information processing system according to an embodiment of the present disclosure will be described with reference to FIG. 1. FIG. 1 is a diagram illustrating a configuration example of the information processing system according to the embodiment of the present disclosure. Note that, in this specification, the system may represent a configuration for executing a predetermined process, and the system as a whole can be regarded as a single device, or the system can be configured by a plurality of devices. The information processing system according to the present embodiment illustrated in FIG. 1 may also be configured to be capable of executing predetermined processing (for example, processing realized by a functional configuration illustrated in FIG. 4) as the entire information processing system and it may be arbitrary which of the components in the information processing system is considered as a single device.

With reference to FIG. 1, an information processing system 100*a* according to an embodiment of the present disclosure includes an input unit 110*a* and an output unit 130*a*.

The output unit 130*a* visually notifies a user of information by displaying various types of information on a table 140*a*. As the output unit 130*a*, for example, a projector is used. As illustrated, the output unit 130*a* is placed above the table 140*a*, for example, spaced apart from the table 140*a* by a predetermined distance as being hung from the ceiling, and projects information onto a top surface of the table 140*a*. A method for displaying information on the top surface of the table 140*a* from above in this manner is also referred to as a "projection type".

Note that, in the following description, the entire area where information is displayed by the output unit 130*a* is also referred to as a display screen (or a display surface). For example, the output unit 130*a* displays, on the display screen, information to be presented to a user, as an application is executed by the information processing system 100*a*.

Here, in a case where the information processing system 100*a* is a projection type, the output unit 130*a* may include a lighting device. In a case where the output unit 130*a* includes a lighting device, the information processing system 100*a* may control a state of the lighting device by turning on, turning off, or the like based on the content of information input by the input unit 110*a* and/or the content of information displayed by the output unit 130*a*.

Further, the output unit 130*a* may include a speaker and may output various types of information as sound. When the output unit 130*a* is configured by a speaker, the number of the speakers may be one or more. In a case where the output unit 130*a* includes a plurality of speakers, the information processing system 100*a* may limit some of the speakers to output sound, or adjust a direction that sound is output.

The input unit 110*a* is a device that inputs operation details by the user who uses the information processing system 100*a*. In the example illustrated in FIG. 1, the input unit 110*a* is provided above the table 140*a*, for example, by hung from the ceiling. As described above, the input unit 110*a* is provided apart from the table 140*a* on which information is displayed. The input unit 110*a* can be configured by an imaging device that can capture the top surface of the table 140*a*, which is the display screen. As the input unit 110*a*, for example, a camera that captures an image of the table 140*a* with one lens, a stereo camera that can record information in a depth direction by capturing images of the table 140*a* with two lenses, or the like can be used. In a case where the input unit 110*a* is a stereo camera, for example, a visible light camera or an infrared camera can be used.

In a case where a camera that captures the table 140*a* with a single lens is used as the input unit 110*a*, the information processing system 100*a* analyzes the image (captured image) captured by the camera so that a position of a physical object placed on the table 140*a* (hereinafter, also referred to as a real object), which is user's hand for example, can be detected. Further, in a case where a stereo camera is used as the input unit 110*a*, the information processing system 100*a* analyzes the image captured by the stereo camera so that depth information (in other words, three-dimensional information) of an object placed on the table 140*a* can be acquired in addition to position information of the object. Based on the depth information, the information processing system 100a can detect that user's hand is in contact with or placed near the table 140a and that the user's hand is leaving from the table 140a in the height direction. Note that, in the following description, touching or bringing user's operating body such as a hand in contact with the information on the display screen is also simply referred to as "contact".

According to the present embodiment, based on the image captured by the input unit 110a, the position of the operating body, which is user's hand for example, on the display screen (that is, the top surface of the table 140a) is detected, and based on the detected position of the operating body, various information is input. In other words, the user can perform various operation inputs by moving the operating body on the display screen. For example, when it is detected that user's hand contacts with a display object, the operation for the display object is input. Note that, in the following description, a case where a user's hand is used as an operating body will be described as an example; however, the present embodiment is not limited to this example and various operation members such as a stylus may be used as the operating body.

Further, in a case where the input unit 110a is configured by an imaging device, the input unit 110a may not only capture an image of the top surface of the table 140a but also capture an image of a user being around the table 140a. For example, the information processing system 100a can detect the position of the user around the table 140a based on the captured image. Further, for example, the information processing system 100a may perform personal recognition of the user by extracting physical features that can identify an individual user, such as user's face and a size of user's body included in the captured image.

Here, the present embodiment is not limited to the above examples, and the user's operations may be input by another method. For example, the input unit 110a may be provided as a touch panel on the top surface of the table 140a, and the user's operation input may be detected by contact of the user's finger or the like on the touch panel. Further, the user's operation input may be detected by a gesture for the imaging device constituting the input unit 110a. Alternatively, the input unit 110a may include a sound input device such as a microphone that collects sound made by a user and environmental sounds of the surrounding environment. As the sound input device, a microphone array for collecting sound in a specific direction can be suitably used. Further, the microphone array can be configured such that the sound collection direction can be adjusted to an arbitrary direction. In a case where a sound input device is used as the input unit 110a, an operation input may be performed using the collected sound. Further, the information processing system 100a may perform individual recognition based on the collected sound by analyzing the collected sound. Alternatively, the input unit 110a may be configured by a remote control device (so-called remote controller). The remote controller may be one in which a predetermined instruction is input by operating a predetermined button arranged on the remote controller, or a predetermined instruction may be input by an operation of the user moving the remote controller by detecting the movement of the remote controller by a sensor such as an acceleration sensor or a gyro sensor mounted on the remote controller. Furthermore, the information processing system 100a may include other input devices such as a mouse, a keyboard, a button, a switch, and a lever (not illustrated) as the input unit 110a, and user operations may be input through these input devices.

The configuration of the information processing system 100a according to the present embodiment has been described above with reference to FIG. 1. Although not illustrated in FIG. 1, another device may be connected to the information processing system 100a. For example, a lighting device for illuminating the table 140a may be connected to the information processing system 100a. The information processing system 100a may control the lighting state of the lighting device according to the state of the display screen.

Figure 2:
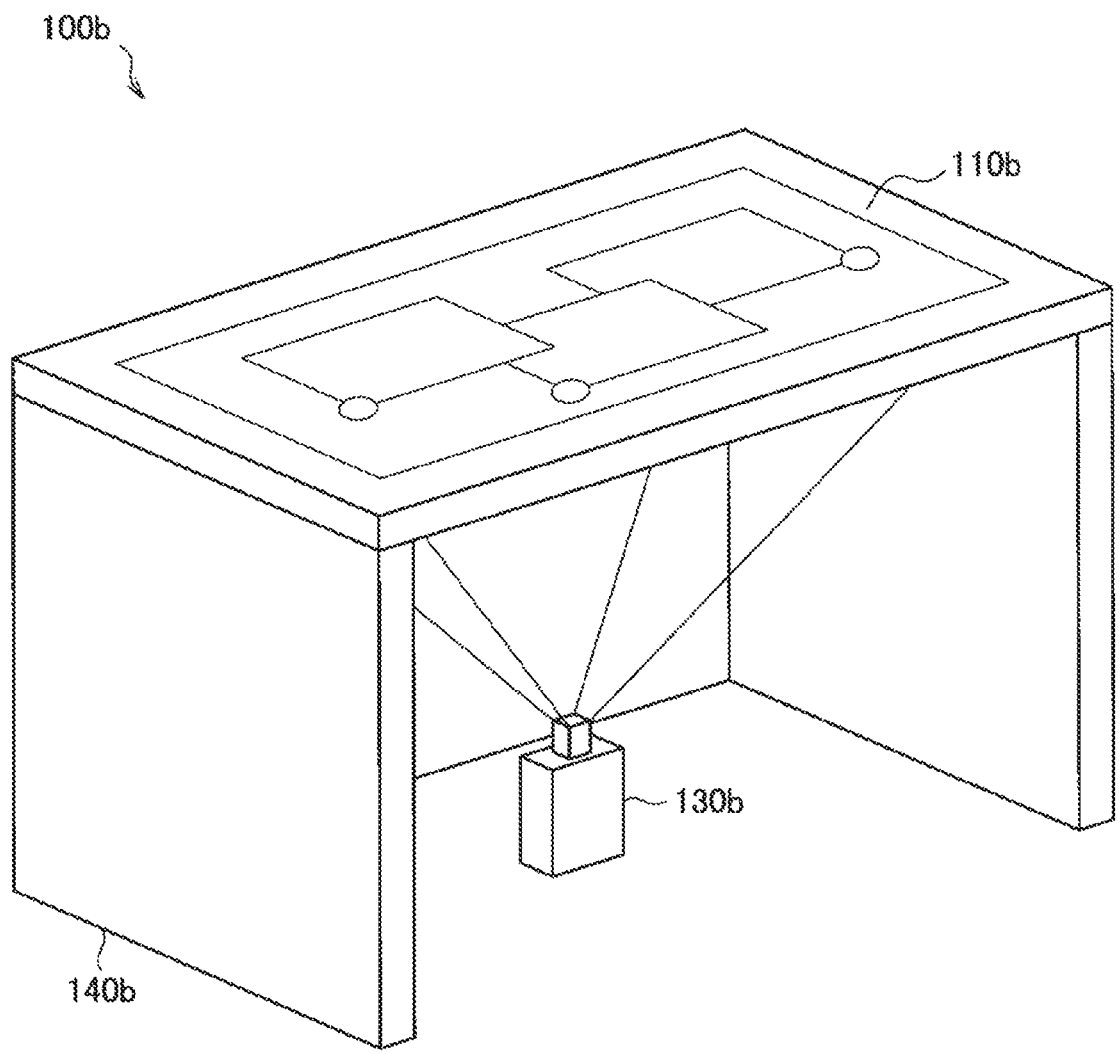
FIG. 2 is a diagram illustrating another configuration example of the information processing system according to the present embodiment.
Figure 3:
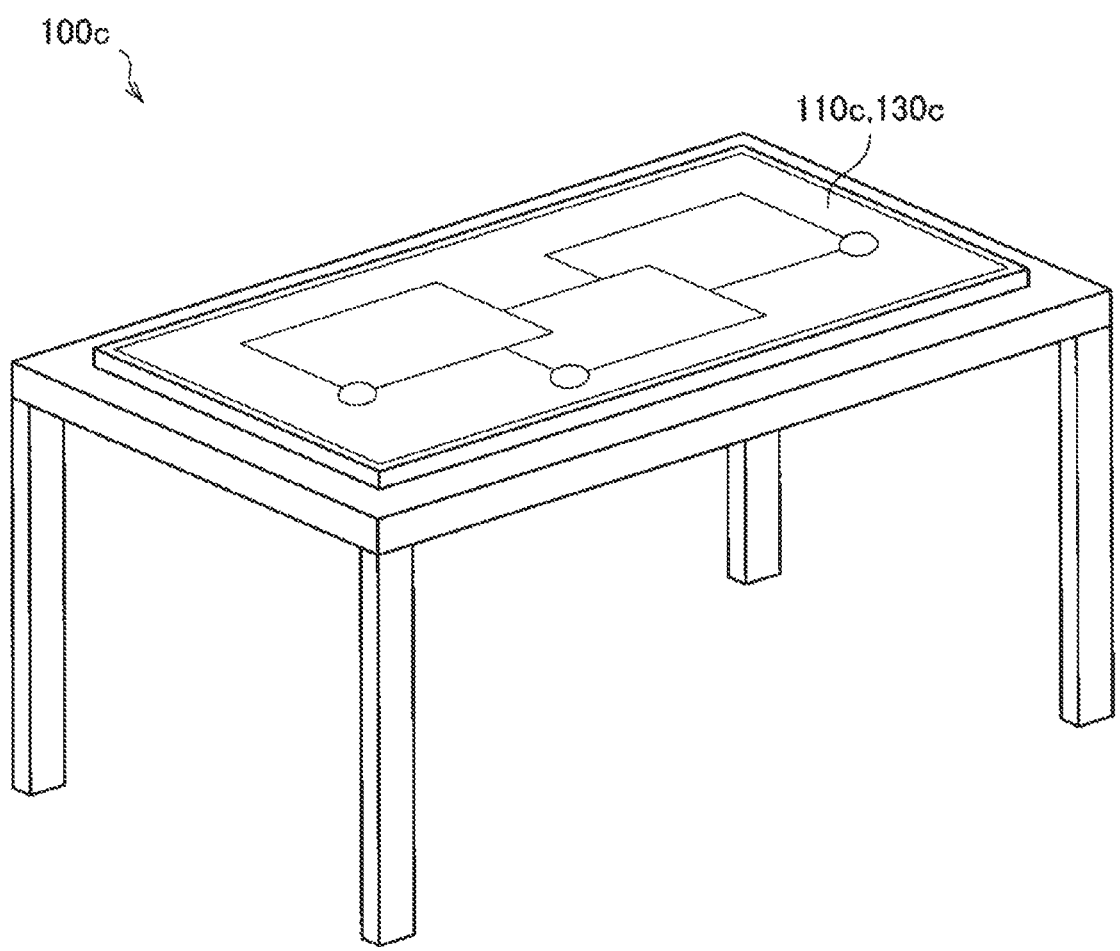
FIG. 3 is a diagram illustrating another configuration example of the information processing system according to the present embodiment.

Here, in the present embodiment, the configuration of the information processing system is not limited to what is illustrated in FIG. 1. The information processing system according to the present embodiment only needs to include an output unit that displays various types of information on the display screen and an input unit that can accept at least an operation input on the displayed information, and detailed configurations thereof are not limited. With reference to FIGS. 2 and 3, other configuration examples of the information processing system according to the present embodiment will be described. FIGS. 2 and 3 are diagrams illustrating other configuration examples of the information processing system according to the present embodiment.

In the information processing system 100b illustrated in FIG. 2, an output unit 130a is provided below the table 140b. The output unit 130a is a projector, for example, and projects information from below toward the top plate of the table 140b. The top plate of the table 140b is formed of a transparent material such as a glass plate or a transparent plastic plate, for example, and the information projected by the output unit 130a is displayed on the top surface of the table 140b. A method of projecting information from the bottom of the table 140b onto the output unit 130a and displaying the information on the top surface of the table 140b is also referred to as a "rear projection type".

In the example illustrated in FIG. 2, the input unit 110b is provided on the top surface (front surface) of the table 140b. The input unit 110b is configured by, for example, a touch panel, and the operation input by the user is performed when contact of the operating body with the display screen (display surface) of the top surface of the table 140b is detected by the touch panel. Note that the configuration of the input unit 110b is not limited to this example, and the input unit 110b may be provided below the table 140b and separated from the table 140b, as in the information processing system 100a illustrated in FIG. 1. In this case, the input unit 110b is configured by, for example, an imaging device and can detect the position of the operating body on the top surface of the table 140b through the top plate formed of a transparent material.

In an information processing system 100c illustrated in FIG. 3, a touch panel display is installed on the table with its display screen (display surface) facing upward. In the information processing system 100c, the input unit 110c and the output unit 130c can be integrally configured as the touch panel display. In other words, various types of information are displayed on the display screen of the display, and the operation input by the user is performed by detecting contact of the operating body with the display screen of the display by the touch panel. Note that, in the information processing system 100c as well, as in the information processing system 100a illustrated in FIG. 1, an imaging device may be provided above the touch panel display as the input unit 110c. The position of the user around the table can be detected by the imaging device.

The other configuration examples of the information processing system according to the present embodiment have been described above with reference to FIGS. 2 and 3.

As described above, the information processing system according to the present embodiment can be realized by various configurations. Here, in the following, the present embodiment will be described by taking as an example the configuration of the information processing system 100a in which the input unit 110a and the output unit 130a are provided above the table 140a illustrated in FIG. 1. Note that functions similar to the functions described below can be realized even with other configurations that can realize the information processing system according to the present embodiment, such as the configurations illustrated in FIG. 2 or 3 described above. In the following description, for the sake of simplicity, the information processing system 100a, the input unit 110a, and the output unit 130a are also simply referred to as the information processing system 100, the input unit 110, and the output unit 130.

<<2. Configuration>>

Figure 4:
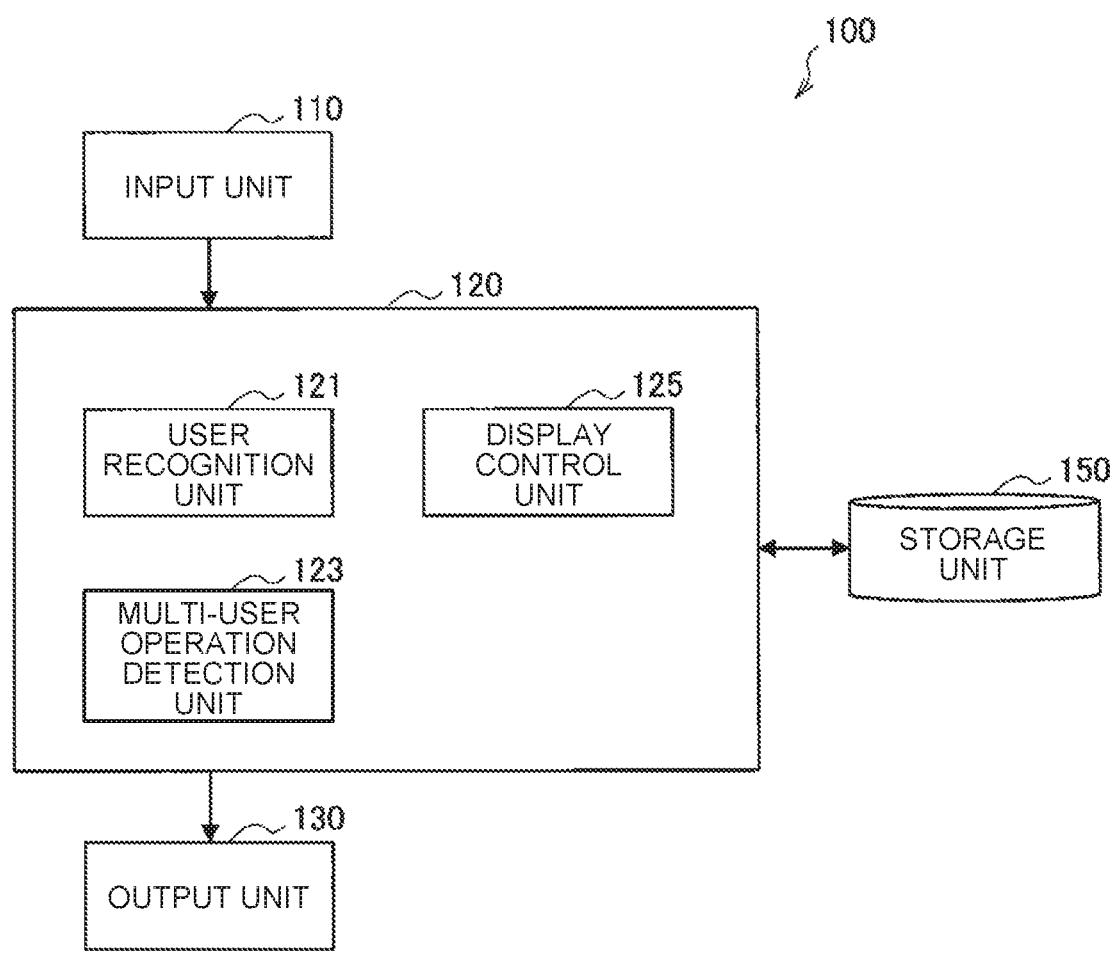
FIG. 4 is a block diagram illustrating an example of a functional configuration of the information processing system according to the present embodiment.

Hereinafter, a functional configuration capable of realizing the information processing system 100 according to the present embodiment described above will be described with reference to FIG. 4. FIG. 4 is a block diagram illustrating an example of a functional configuration of the information processing system 100 according to the present embodiment.

Referring to FIG. 4, the information processing system 100 according to the present embodiment includes an input unit 110, a control unit 120, an output unit 130, and a storage unit 150 as its functions.

(1) Input Unit 110

The input unit 110 is an input interface for inputting various information to the information processing system 100. The user can input various types of information to the information processing system 100 via the input unit 110. The input unit 110 corresponds to the input units 110a to 110c illustrated in FIGS. 1 to 3. According to the present embodiment, the input unit 110 is configured to receive at least a user operation input on the display object displayed by the output unit 130.

For example, the input unit 110 is configured by an imaging device, and captures an image including a user's hand on the display screen, an object placed on the display screen, and the like. Information (for example, information about the captured image) input via the input unit 110 is provided to the later described control unit 120 so that a user operation input is detected or an object is detected. The imaging device may be a visible light camera or an infrared camera, for example. Further, as described above, the input unit 110 may be configured as an imaging device such as a stereo camera, which includes a function as a depth sensor capable of acquiring depth information. On the other hand, the depth sensor may be configured separately from the imaging device as a sensor using an arbitrary method such as a time of flight method or a structured light method. Further, the input unit 110 may include a touch sensor. In that case, the touch sensor detects a touch on the display screen. And the function for detecting the user's hand which is not touching on the display screen and the object on the display screen may be secured by the depth sensor and/or the imaging device which captures an image of the display screen from above.

For example, the input unit 110 can detect operations such as touching, tapping, double tapping, dragging, flicking, swiping, and the like on a display object or a real object displayed on the display screen (display surface). Note that, in the present specification, as described with reference to FIGS. 1 to 3, the display screen (display surface) is, for example, a flat area corresponding to a screen such as the top surface of the table 140a or the table 140b, or an entire area where information is displayed by the output unit 130 such as a touch panel display. Further, the input unit 110 can also detect an operation of placing a hand over the display object displayed on the display screen or the real object. Such an operation is also referred to as a hover. The hover detection is effective for detecting intention of the user to operate on the display object or the real object before the user actually operates (for example, before tapping). Further, the input unit 110 can also detect operations such as touching, tapping, double tapping, dragging, flicking, swiping, and the like on a no-display-object region on the display surface, that is, a region where a display object is not displayed on the display surface.

(2) Control Unit 120

The control unit 120 includes various processors such as a CPU or a DSP, and controls the operation of the information processing system 100 by executing various arithmetic processes. For example, the control unit 120 operates according to a program stored in the storage unit 150 or another storage device. The control unit 120 can be regarded as an information processing apparatus that processes various types of information. As illustrated, the control unit 120 includes a user recognition unit 121, a multi-user operation detection unit 123, and a display control unit 125 as its functions. Note that the control unit 120 may have functions other than these functions. Further, each function of the control unit 120 is realized by a processor that constitutes the control unit 120 operating according to a predetermined program.

(2-1) User Recognition Unit 121

The user recognition unit 121 recognizes a user who uses the system, that is, one or more users being around the display surface on which display objects are displayed (specifically, the table 140a illustrated in FIG. 1, the table 140b illustrated in FIG. 2, the touch panel display configured by the input unit 110c and the output unit 130c illustrated in FIG. 3). For example, the user recognition unit 121 analyzes a captured image captured by the input unit 110 and recognizes the position and number of users.

Further, the user recognition unit 121 can also perform face analysis by collating with a registered face image to recognize whether or not the user is a registered user. Further, the user recognition unit 121 can also recognize the user's state, such as whether the user is standing or sitting.

(2-2) Multi-User Operation Detection Unit 123

The multi-user operation detection unit 123 detects a predetermined operation (that is, a collaborative operation performed by a plurality of users in cooperation) performed by the plurality of users at the same operation timing. As the predetermined operation, for example, operations such as touching, tapping, double tapping, flicking, and the like to a no-display-object region (display surface region where no display object is displayed) on the display surface are assumed. Operations such as touching, tapping, and double-tapping on the display object displayed on the display surface or real object are recognized as individual operations of each user, and individual interactions occur.

Further, "at the same operation timing" means that the operations are performed substantially at the same time. For example, a predetermined operation by another user within a certain period of time after a predetermined operation is performed by one user (another predetermined operation that has entered with a delay within a certain period of time after the start of the first predetermined operation) may be recognized as an operation performed at the same time. Alternatively, by using a predetermined voice by the user as a trigger, an operation performed within a predetermined time after the voice is detected by the sound input device included in the input unit 110 may be recognized as an operation performed at the same time.

In a case where the operations are performed by a plurality of users at the same time in this manner and the operations are all the same, the multi-user operation detection unit 123 detects the operations as simultaneous operations by the plurality of users. In a case where the operation timing is not simultaneous or a case where the operations of all the users are not the same even when the operations are performed at the same time, the multi-user operation detection unit 123 regards the operations as failure. Here, "all the users" basically assume the all users who are recognized by the user recognition unit 121 and exist around the display surface, and will be described in detail later.

The multi-user operation detection unit 123 outputs the detection result to the display control unit 125.

(2-3) Display Control Unit 125

The display control unit 125 has a function of controlling display on the display screen.

For example, the display control unit 125 generates display information for displaying information on the display screen, and outputs the generated display information to the output unit 130, thereby causing the output unit 130 to output the information. In this manner, displaying information based on the control by the display control unit 125 in the information processing system 100 is simply referred to as displaying information by the information processing system 100 or displaying information by the display control unit 125. Various controls by the display control unit 125 can be considered.

For example, the display control unit 125 may control display of a display object that indicates an interaction from an application in response to a user input. In this case, the display control unit 125 can function as a general OS control layer that performs drawing control of multi-contents for displaying an application and event distribution such as touching for each content.

In addition, the display control unit 125 according to the present embodiment can also perform an interaction to output one feedback for all displayed images in response to the same predetermined operation performed by the all the users at the same time. Although details will be described later, for example, display control is performed such that images displayed on the display surface (all display objects and background images) are rotated about a center of the display surface, all display objects are lifted, or all display objects are hidden (erased). According to the present embodiment, such feedback in all the display images displayed on the display surface is executed according to simultaneous operations performed by the all users who have agreed, not by the individual user operations. The feedback that acts on all display objects affects the all users; however, according to the present embodiment, since feedback is performed in response to simultaneous operations by the all users, the operation is prevented from being interrupted or disturbed by an arbitrary operation by one user. In addition, since all display objects can be operated with simple operations by all members, work speed and operation efficiency can be improved.

Here, "the all users" basically assumes the all users recognized by the user recognition unit 121 and exist around the display surface. More specifically, for example, "the all users" may represent all users recognized by the user recognition unit 121 (all persons recognized based on captured images, audio information, or the like captured around the display surface), or all users around the display screen (specifically, the table 140a illustrated in FIG. 1, the table 140b illustrated in FIG. 2, and the touch panel display configured by the input unit 110c and the output unit 130c illustrated in FIG. 3). Alternatively, "the all users" may represent all users who are performing operations such as touching on the display surface (more specifically, all users who have performed operations for a predetermined period of time before the time when the simultaneous operation is detected).

In addition, as a usage manner of the information processing system 100, it is assumed that there may be a user who is only observing around the users who are performing the operation. In this case, the multi-user operation detection unit 123 may distinguish between an operating user (operator) and an observing user (audience) and detect the simultaneous operation of all the operation users.

The distinction between the operating user and the observing user may be determined based on, for example, whether the face image is a registered predetermined user or whether the user is near the display surface (within a predetermined range from where the user can reach the display surface), or whether the person is sitting or not.

(3) Output Unit 130

The output unit 130 is an output interface for notifying the user of various types of information processed by the information processing system 100. The output unit 130 is configured by a display device such as a display, a touch panel, a projector, or the like for example, and displays various types of information on the display screen under the control of the display control unit 125. The output unit 130 corresponds to the output units 130a to 130c illustrated in FIGS. 1 to 3, and displays a display object on the display screen as described above. Note that the present embodiment is not limited to such an example, and the output unit 130 may further include an audio output device such as a speaker, and may output various types of information as audio.

(4) Storage Unit 150

The storage unit 150 is configured by various storage devices such as a magnetic storage device including a hard disk drive (HDD), a semiconductor storage device, an optical storage device, or a magneto-optical storage device, and stores various information processed by the information processing system 100.

The configuration of the information processing system 100 according to the present embodiment has been specifically described above. Here, as described above, in this specification, the system may represent a configuration for executing a predetermined process, and the system as a whole may be regarded as one device, or the system may be configured by a plurality of devices. In other words, the configuration of the information processing system 100 illustrated in FIG. 4 may be performed by one device or a plurality of devices.

Further, in a case where the configuration of the information processing system 100 is realized by a plurality of devices, each device constituting the information processing system 100 is connected by wired or wireless, and data input/output can be appropriately performed. Further, data input/output may be performed via the Internet. Further, the control unit 120 and the storage unit 150 may be provided in, for example, one or a plurality of servers on a network. Alternatively, the control unit 120 and the storage unit 150 may be provided in a server on the network and an intermediate server or an edge server having a communication distance relatively closer to the input unit 110 and the output unit 130 than the server. By appropriately distributing each configuration, it is possible to reduce the processing load, improve the real-time property, and further ensure security.

<<3. Operation Processing>>

Figure 5:
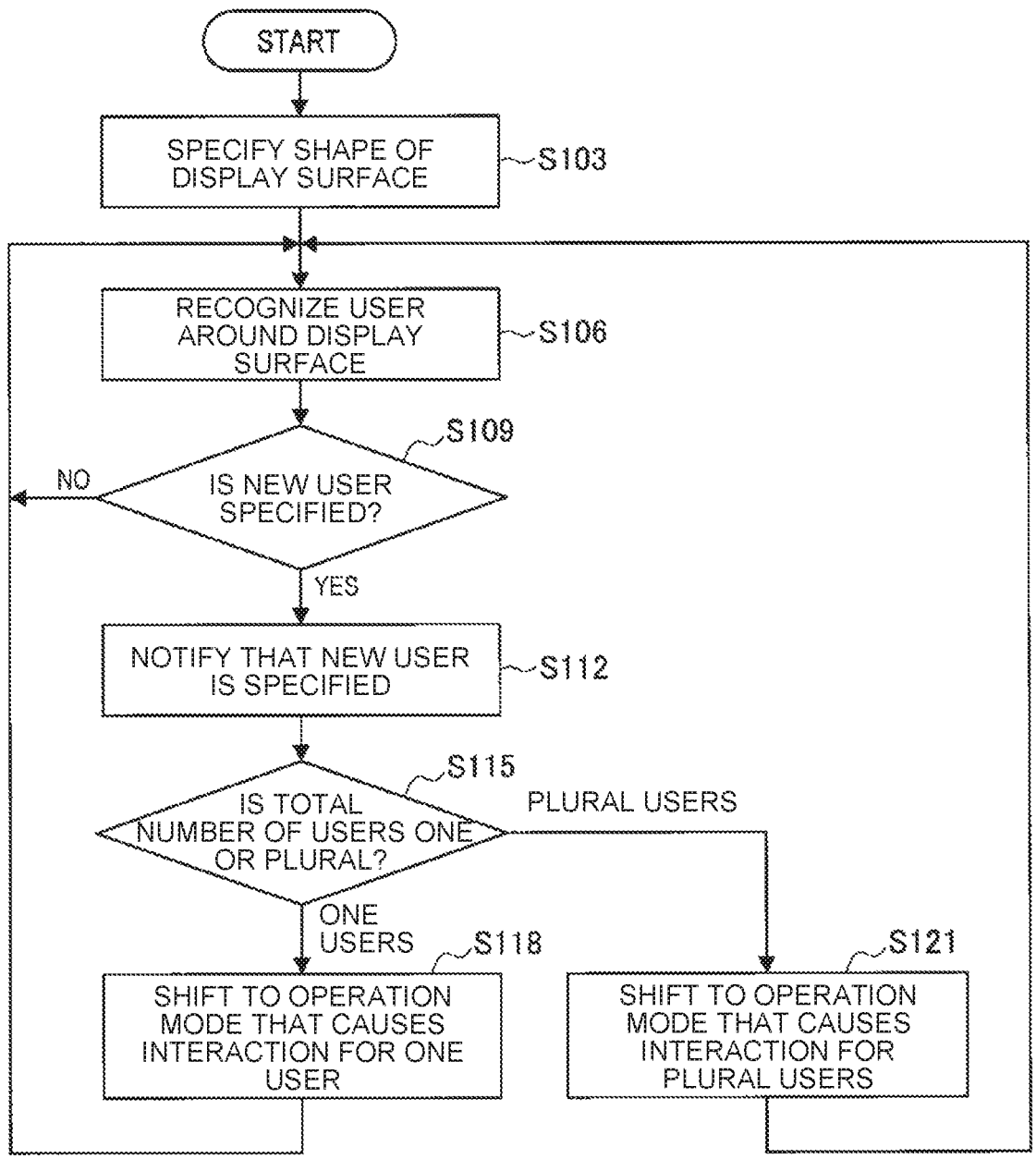
FIG. 5 is a flowchart illustrating an example of a flow of information processing executed by the information processing system according to the present embodiment.

Subsequently, the operation processing of the information processing system according to the present embodiment will be described in detail with reference to FIG. 5. FIG. 5 is a flowchart illustrating an example of a flow of information processing executed by the information processing system 100 according to the present embodiment.

As illustrated in FIG. 5, first, the information processing system 100 specifies a shape of the display surface (step S103). The information processing system 100 can specify a shape of the display surface based on the captured image acquired from the input unit 110, setting information, or the like.

Next, the information processing system 100 recognizes the user around the display surface by the user recognition unit 121 (step S106). More specifically, the user recognition unit 121 recognizes the number and arrangement of users.

Next, the information processing system 100 specifies a new user (step S109). For example, the information processing system 100 identifies the new user being around the display surface based on the captured image, audio information, or operation information input by the input unit 110. The information processing system 100 always recognizes the user around the display surface, and recognizes the number of users and changes in their positions.

Next, when a new user is specified (step S109/Yes), the information processing system 100 notifies that the user has been specified (step S112). The notification method is not particularly limited, but the output unit 130 can notify that the new user has been specified by image display or audio output. Thereby, the user can recognize that the user has been recognized by the system side.

Next, the information processing system 100 determines whether the total number of the users (users who perform operations) who use the system is one user or plural users (step S115). The information processing system 100 determines that the total number of users is one when only one user exists around the display surface, and determines that the number is a multiple number when there are a plurality of users. Further, the total number of users determined here may be only the operating users as long as the operating users and the observing users can be distinguished as described above.

Next, when the total number of users is one, the information processing system 100 shifts to an operation mode in which an interaction for one user is caused (step S118).

On the other hand, when there are a plurality of total users, the information processing system 100 shifts to an operation mode in which an interaction for a plurality of persons is caused (step S121). In the operation mode for a plurality of persons, a predetermined operation performed simultaneously by all users is detected, and predetermined display control for all display objects is performed. Even in the operation mode for a plurality of persons, each user's individual interaction with the display object or the real object can be individually recognized and corresponding display control can be performed.

The example of the operation process according to the present embodiment has been described above. Note that the operation processing illustrated in FIG. 5 is an example, and the present disclosure is not limited to the example illustrated in FIG. 5. For example, the present disclosure is not limited to the order of steps illustrated in FIG. 5. At least some of the steps may be processed in parallel, or may be processed in the reverse order. For example, the process in step S103 and the processes in steps S106 to S121 may be performed in parallel or in the reverse order.

Further, all the processes described in FIG. 5 may not always have to be executed. For example, the notification process described in step S112 may be skipped.

Each process described in FIG. 5 does not necessarily have to be performed sequentially in time. For example, the process described in step S103 may be performed when the system is started, steps S106 to S115 may be performed every predetermined time, step S118 may be performed when the total number of users changes from a plural number to one, and step S121 may be performed when the total number of users changes from one to a plural number.

In addition, the information processing system 100 may always perform display control by recognizing individual interactions of one or more users without performing control such as the transition of the operation mode described in steps S115 to S121 and, when detecting operation simultaneously performed by all users, predetermined display control for all display objects may be performed.

<<4. Specific Examples>>

Hereinafter, application examples of the information processing system 100 according to the present embodiment will be specifically described.

<4-1. First Specific Example>

This specific example is an example in which all users perform a same operation at the same time. Hereinafter, a description will be given with reference to FIGS. 6 to 11.

Figure 6:
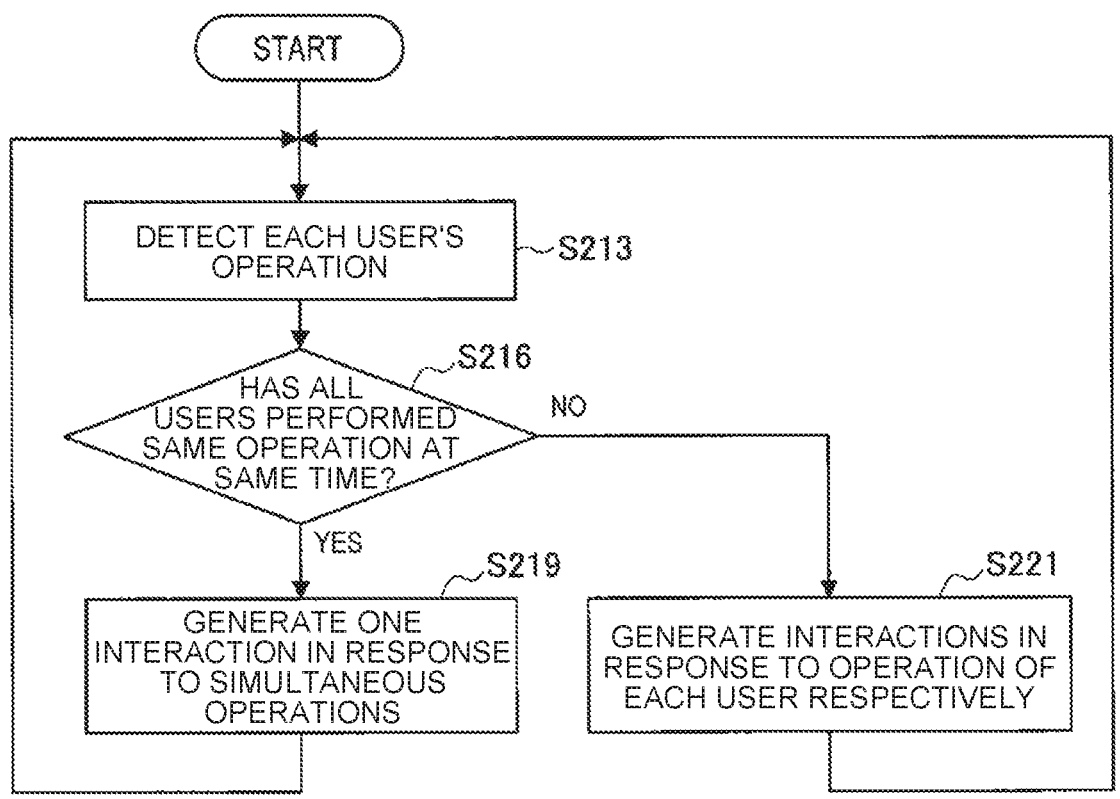
FIG. 6 is a flowchart illustrating an example of operation processing according to a first specific example executed by the information processing system according to the present embodiment.

FIG. 6 is a flowchart illustrating an example of operation processing according to the first specific example executed by the information processing system according to the present embodiment.

As illustrated in FIG. 6, first, the information processing system 100 detects operation by each user (step S213).

Next, the information processing system 100 determines whether all users have performed a same operation at the same time (step S216).

Next, when it is determined that all of the users have performed the same operation at the same time (step S216/Yes), the information processing system 100 causes one interaction corresponding to a predetermined simultaneous operation (step S219).

On the other hand, when all the users are not performing the same operation at the same time (step S216/No), the information processing system 100 causes an interaction corresponding to the operation of each user respectively (step S221).

(Example of Interaction in Response to Simultaneous Operation)

Here, an example of the interaction in response to simultaneous operation performed by all users will be described.

Figure 7:
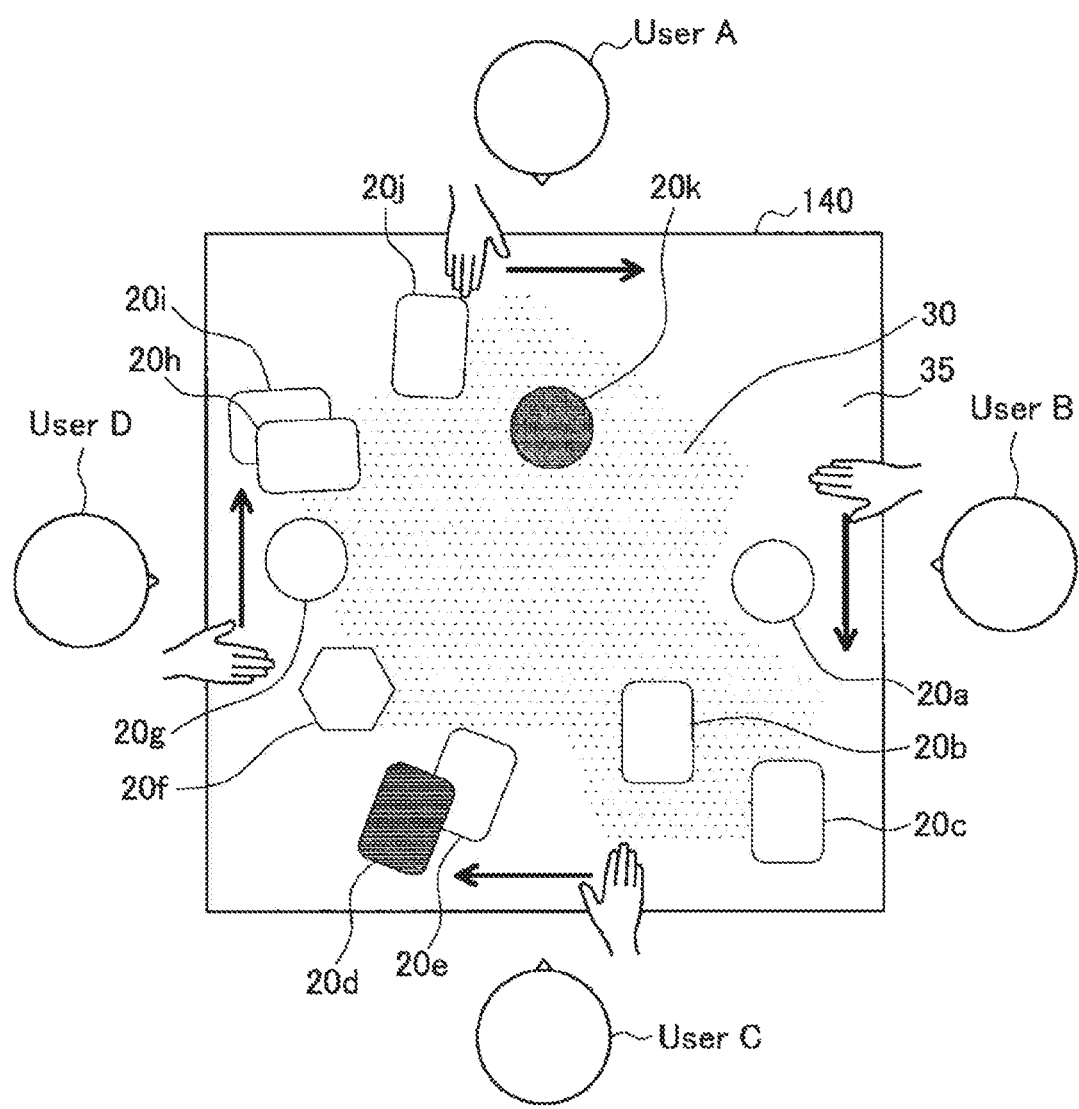
FIG. 7 is a diagram illustrating an example of simultaneous operation performed by all users in the first specific example.

FIG. 7 is a diagram illustrating an example of the simultaneous operation performed by all users in the first specific example. Here, as illustrated in FIG. 7, it is assumed that user A, user B, user C, and user D surround the table 140 and the four users are recognized by the system side.

On the table 140, a large number of display objects 20 (20a to 20k) and a background image 30 are displayed as display images. Each user can individually perform operations such as touching, tapping, double tapping, dragging, flicking, and swiping or the like on each display object 20.

Figure 8:
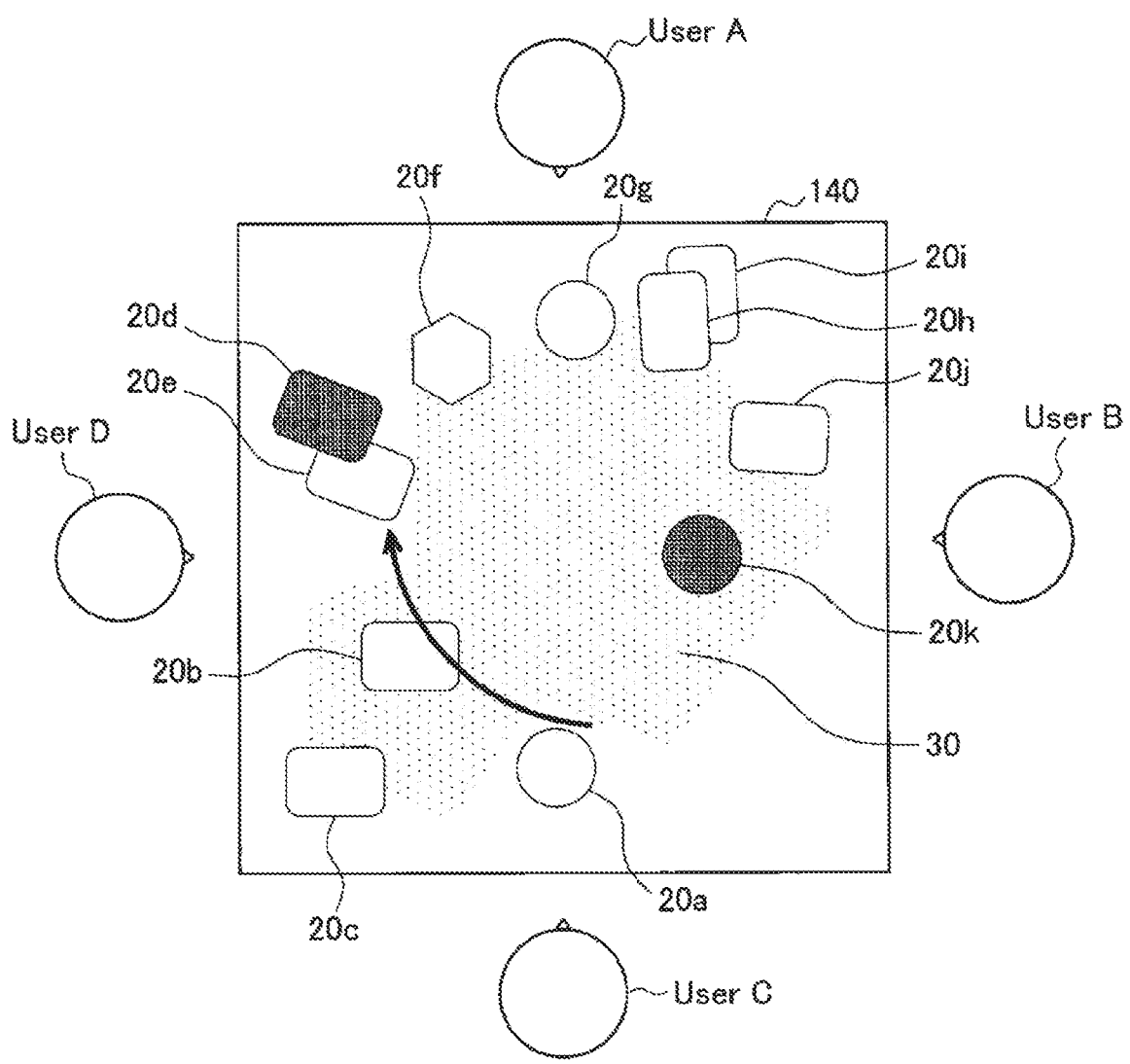
FIG. 8 is a diagram illustrating an example of an interaction in response to the simultaneous operation performed by the all users in the first specific example.

Here, as an example of the simultaneous operation, for example, when all the users simultaneously perform a flick operation in the same direction as viewed from each user on the table 140 as illustrated in FIG. 7, all display images (the display objects 20 and the background image 30) on the display surface (the table 140) can be rotated by 90 degrees in the flick operation direction about the center of the display surface as illustrated in FIG. 8. With this configuration, in a table game or the like, since all of the display objects can be moved in a batch operation without having to operate each display object when all the display objects at hand need to be given to an adjacent user or the like, and this improves the work speed and work efficiency. In addition, since the display control that affects all users such as movement of all display objects is performed in response to simultaneous operation of all users, it is possible to prevent a case where one user performs an operation without permission from all other users. Note that, here, the information processing system 100 detects the flick operations in the same direction as viewed from each user as an operation that triggers rotation; however, a drag operation or a swipe operation may be detected instead of the flick operation. In addition to the flick operation, the information processing system 100 may detect a touch operation that draws an arc in the same direction as viewed from each user (for example, a touch operation in which each user draws an arc clockwise).

Note that the flick operation illustrated in FIG. 7 may be processed so as to be effective in the case of an operation on the table 140, more specifically, in the no-display-object region 35. Here, as an example, the background image 30 is displayed and rotated together with the display object 20, but the background image 30 may not be rotated depending on the setting.

Further, the rotation interaction corresponding to the simultaneous operation may be generated only when the shape of the table 140 (display surface) is a shape that conforms to a regular circle or a regular even-numbered polygon such as a square.

Further, the information processing system 100 may appropriately control (enlarging and reducing) the aspect ratio of the display surface after rotation according to the shape of the table 140 so that the display image is displayed within the range of the table 140. Further, the information processing system 100 may slightly change the arrangement of the display objects (gather the display objects to the center, or the like) so that all the display objects are displayed within the range of the table 140.

Further, the rotation angle is not limited to 90 degrees, and can be appropriately set according to the shape of the table 140 (display surface), the arrangement of the user, and the like.

Figure 9:
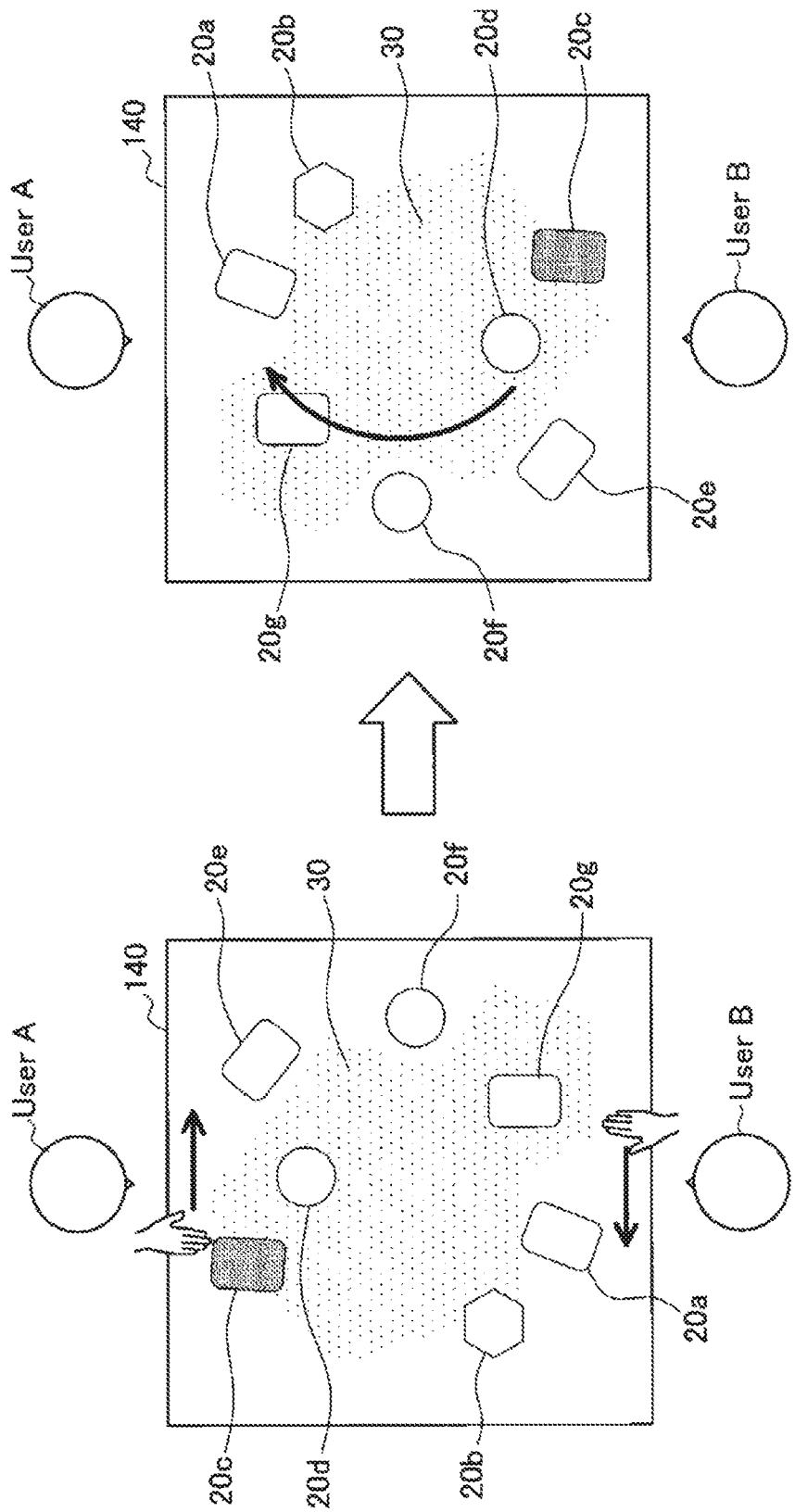
FIG. 9 is a diagram illustrating an application example of the interaction in response to the simultaneous operation in the first specific example.

For example, as illustrated in the left side of FIG. 9, when two users are facing each other at the square table 140 and the both users flick operation at the same time, the information processing system 100 performs display control to rotate the display image (the display objects 20 and the background image 30) 180 degrees in the direction in which the flick operation is performed, as illustrated in the right side of FIG. 9. With this configuration, the display objects placed at each user can be handed over to the other user.

In addition, the information processing system 100 considers that the simultaneous operation has failed when the operations of all the members are not complete or the operations are not performed by all the members, so that the rotation control of the display images as described above is not performed. In this case, the information processing system 100 may perform display control to start rotating the display image and returning the display images back as illustrated in FIG. 10.

Figure 10:
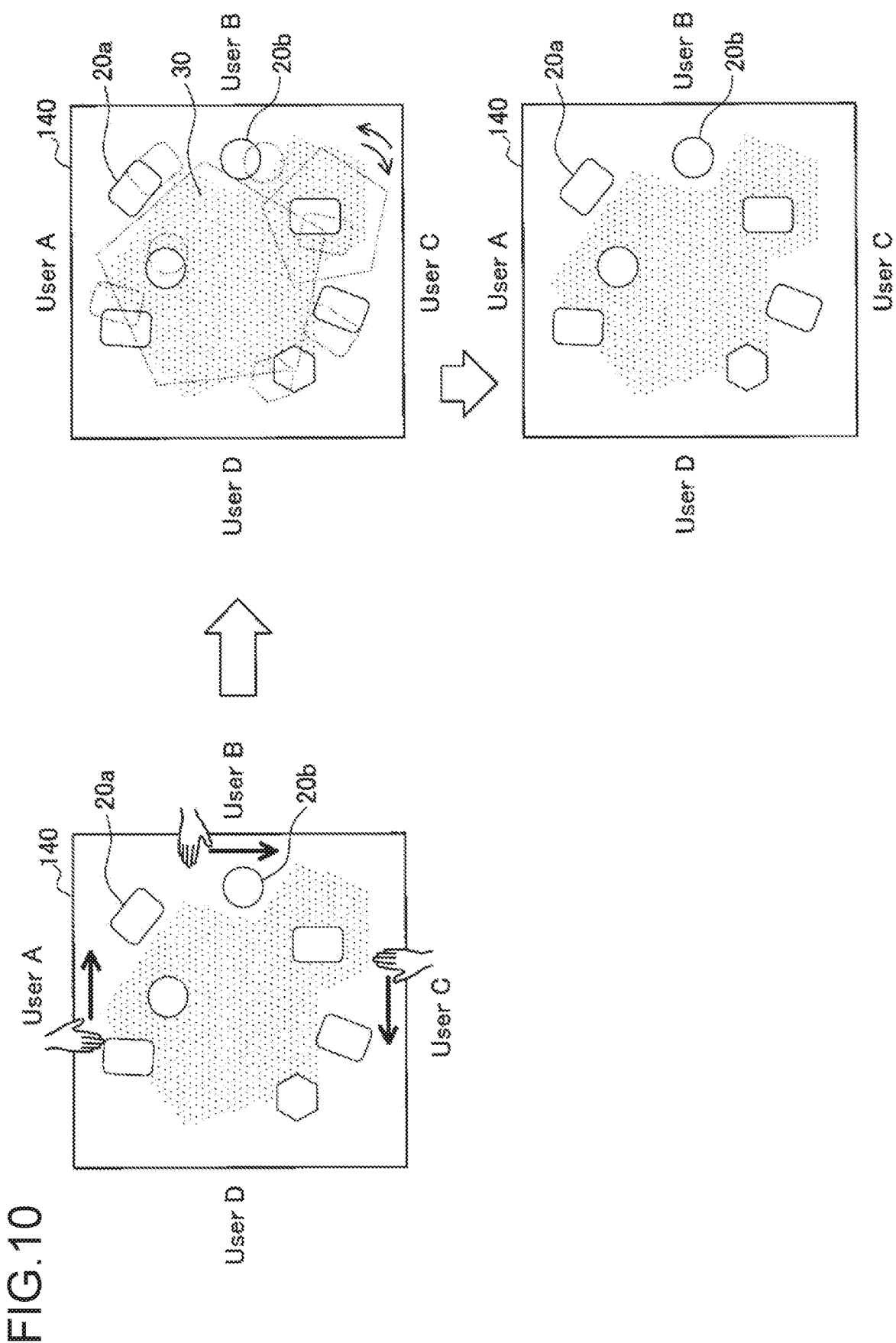
FIG. 10 is a diagram illustrating an example of display control when the simultaneous operation fails in the first specific example.

FIG. 10 is a diagram illustrating an example of display control when the simultaneous operation in the first specific example fails. As illustrated on the left side of FIG. 10, when four users surround the table 140 and the user A, the user B, and the user C perform the flick operation at the same time, but the user D does not perform the operation, animation display may be performed in which the display image (the display object 20 and the background image 30) is rotated slightly in the flick operation direction and then returned as illustrated in the upper right in FIG. 10 and the lower right in FIG. 10. With this configuration, it becomes possible to intuitively notify the users that the rotation has failed due to insufficient cooperation.

In the above, the flick operation has been described as an example of the same simultaneous operation performed by all the users, and the rotation of the display image has been described as the corresponding interaction. Note that, the simultaneous operation and the corresponding interaction are not limited to the above described example, and the rotation control of the display image may be performed by another operation, or another interaction may be performed. For example, operations such as hitting the table with palms of both hands or hitting the table twice with palm of one hand may be used. Hereinafter, another example will be specifically described with reference to FIG. 11.

Figure 11:
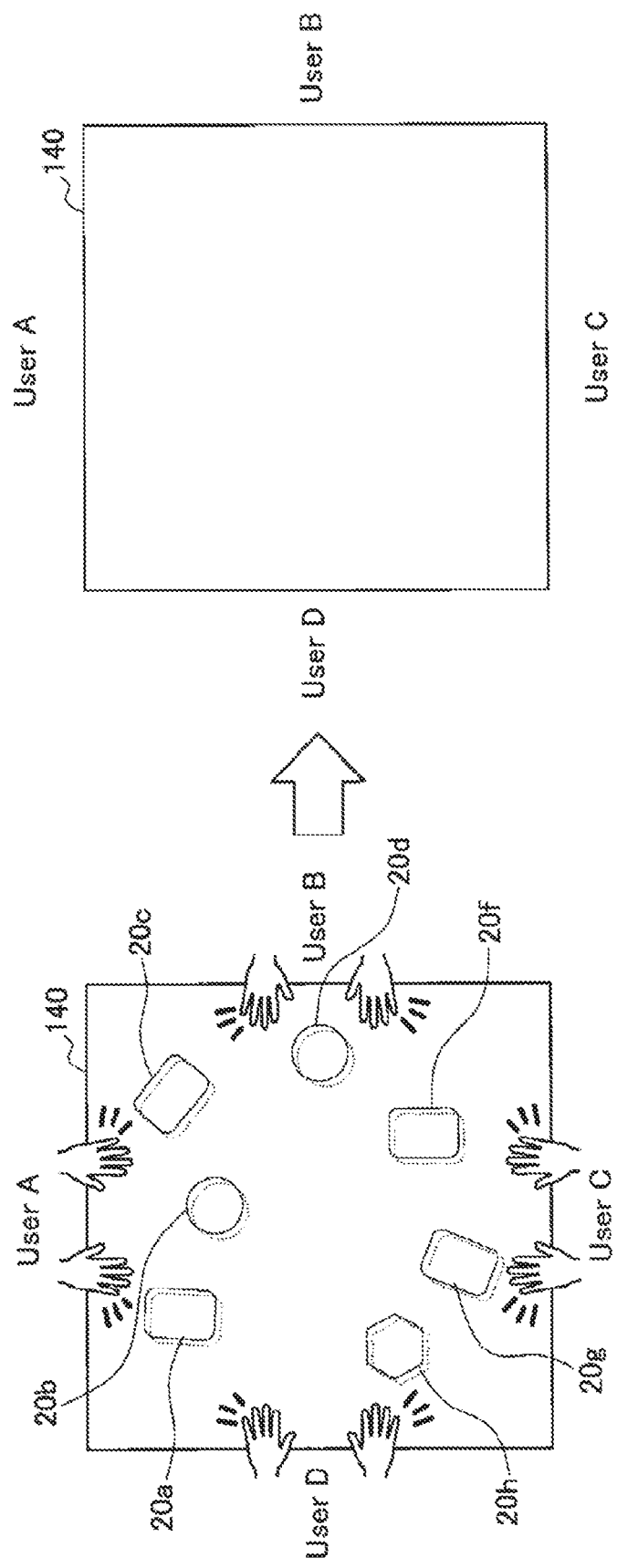
FIG. 11 is a diagram illustrating an example of an interaction in response to another simultaneous operation in the first specific example.

FIG. 11 is a diagram illustrating an example of an interaction according to another simultaneous operation in the first specific example. For example, as illustrated on the left in FIG. 11, the display objects 20 (20*a* to 20*h*) are displayed on the table 140 in a state where four users surround the table 140. In this case, if all the users perform an operation of hitting the table 140 with both hands at the same time, the information processing system 100 may clear all display objects 20 as illustrated on the right in FIG. 11 after generating an interaction that acts on all the display objects 20 (floating once, shaking, or the like for example).

When multiple p persons are working on the table 140, many display objects may be displayed. In such a case, when it is desired to clear everything, it takes time if erasing operation is performed one by one. Therefore, as illustrated in FIG. 11, by allowing the display object to be wiped out as an interaction caused by the simultaneous operation, the user's work speed and efficiency can be improved. In addition, the simultaneous erasure of the display objects has a large risk of erroneous operation; however, according to the present embodiment, it is conditional on the same operation by all users at the same time, and the erasure cannot be realized unless all the users have agreed so that it can be said that it is a simple and efficient method that prevents an error operation by one user.

<4-2. Second Specific Example>

As described above, the simultaneous operation by a plurality of users has been described; however, the information processing system 100 according to the present embodiment performs display control that acts on all display objects so that the display object is recognized even when one user is operating.

When the quality of the display image is improved, there may be a case where a real body (real object) placed on the table and a display object while using the system. Therefore, in the present embodiment, by performing display control that acts on all display objects by a simple operation, the user can intuitively recognize whether the object is a display object or a real object without actually touching the target object. The display speed according to the present embodiment improves work speed and efficiency, particularly in a case where a large number of objects are scattered on the table since it takes time to confirm each one of the objects.

Hereinafter, a specific description will be given with reference to FIGS. 12 to 14.

Figure 12:
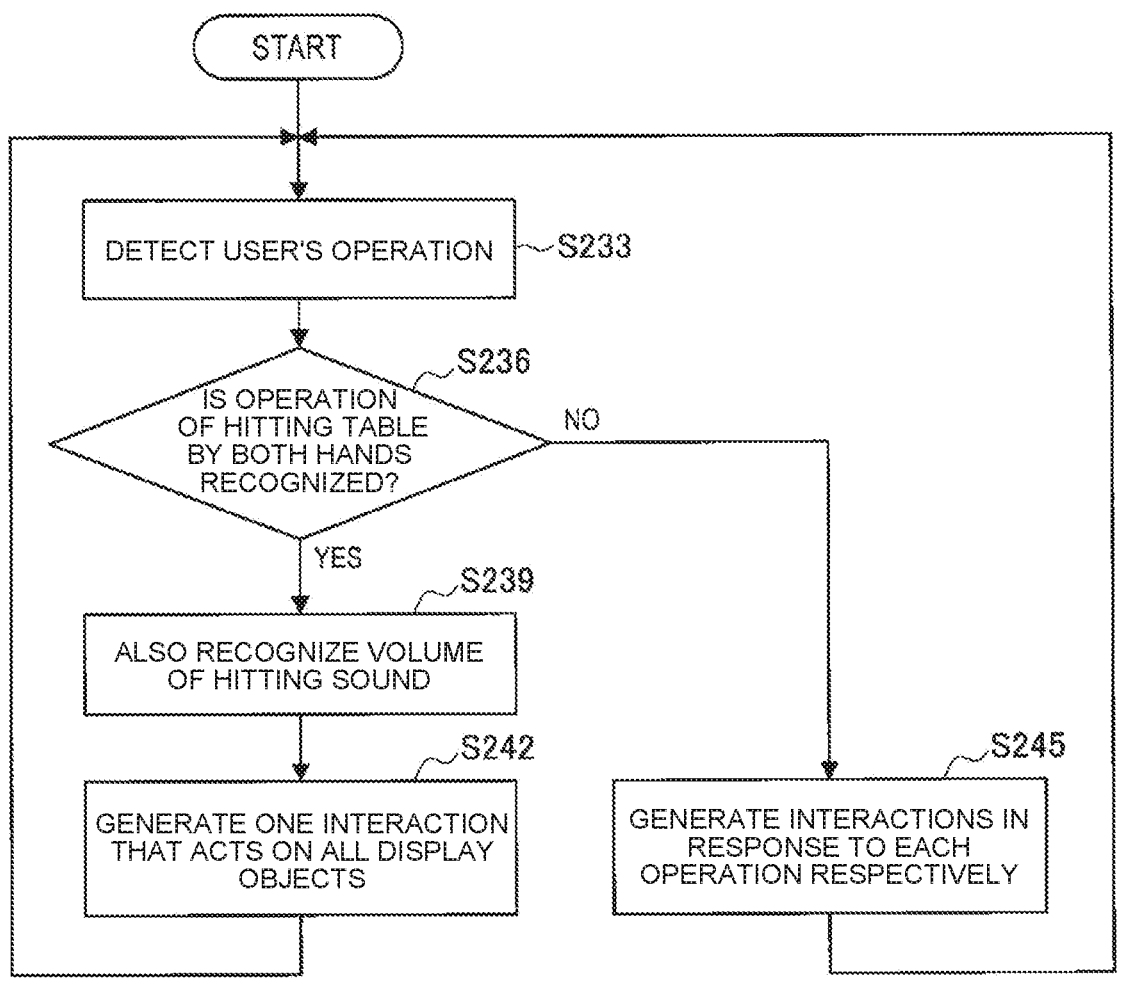
FIG. 12 is a flowchart illustrating an example of operation processing according to a second specific example executed by the information processing system according to the present embodiment.

FIG. 12 is a flowchart illustrating an example of operation processing according to the second specific example. As illustrated in FIG. 12, first, the information processing system 100 detects each user's operation (step S233).

Next, when the operation of hitting the table (display surface) with both hands is recognized (Step S216/Yes), the information processing system 100 also recognizes the volume of the hitting (Step S239) and generates one interaction that acts on all the display objects (step S242). As the interaction, for example, there may be an expression in which all display objects are raised once, an expression that all display objects are shaken, or an expression that generates ripples from the user's hand and moves the display object up and down (shakes).

In addition, the information processing system 100 may control the strength of the interaction that acts on the display objects according to the volume of the sound. For example, the magnitude of the shaking of the display object may be controlled according to the loudness of the sound. Here, an example of sensing the loudness of sound is described as an example; however, the present embodiment is not limited to this example and, for example, the input unit 110 may include a function as a depth sensor that can acquire depth information. With such a configuration, the movement and speed of the user's hand on the table may be also sensed, and the information processing system 100 may control strength of interaction that acts on the display object according to the movement and speed of the user's hand hitting the table.

On the other hand, when the operation is not an operation of hitting the table with both hands (step S216/No), the information processing system 100 generates an interaction in response to each operation individually (in each display object) (step S245). More specifically, the interaction may be a normal interaction for moving, enlarging/reducing, and clearing individual display objects.

(Examples of Interaction)

Here, FIG. 13 illustrates an interaction for generating a ripple. FIG. 13 is a diagram illustrating an example of a ripple expression acting on all display objects according to the second specific example.

As illustrated on the left of FIG. 13, for example, there is one user A who are performing operations in the vicinity of the table 140, the display object 20 and the background image 30 are displayed on the table 140, and the real objects 40 (40a, 40b, 40c) are placed on the table 140.

In this case, as illustrated in the right of FIG. 13, when user A hits the table 140 with both hands, a ripple display (animation) from user A's hand is generated, and an interaction that the ripple display. 50 shakes all display objects 20 and background image 30 is generated. At this time, since the real objects 40a to 40c do not move, the user A can intuitively distinguish between the display objects 20 and the real objects 40.

Moreover, since the system side also recognizes the existence of a real objects, it is possible to generate an interaction that also acts on the real objects. FIG. 14 is a diagram illustrating an example of an expression of water flowing on all display objects and real objects according to the second specific example.

Figure 14:
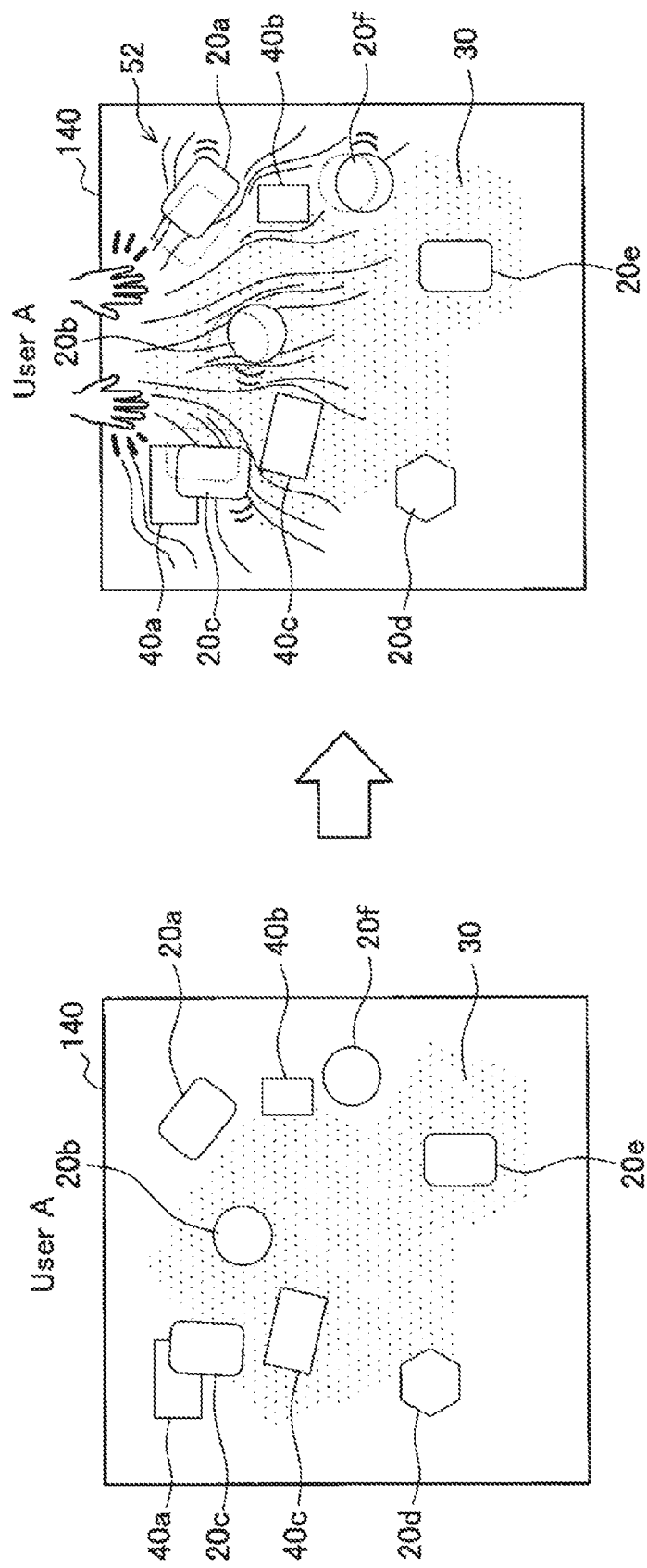
FIG. 14 is a diagram illustrating an example of a water flow expression acting on all display objects and real objects according to the second specific example.

As illustrated on the left of FIG. 14, for example, there is one user A who are performing operations around the table 140, and the display objects 20 and the background image 30 are displayed on the table 140, and the real objects 40 (40a, 40b, 40c) are placed on the table 140.

In this case, as illustrated in the right of FIG. 14, when the user A hits the table 140 with both hands, the water flow display 52 (animation) from the user A's hand is generated, and all the display objects 20 and the background image 30 are shaken. In addition, the real objects 40a to 40c do not move, and the water flow animation in the water flow display 52 avoids the real objects 40a to 40c, so that the user A can intuitively and more clearly distinguish the display objects 20 and the real object 40.

The second specific example has been described above. Note that the interaction according to this example may be generated when a plurality of users perform a predetermined simultaneous operation such as tapping the table 140 with both hands at the same timing.

<4-3. Third Specific Example>

Next, a third specific example will be described with reference to FIGS. 15 to 19. The information processing system 100 according to the present embodiment generates a particular interaction when the timing of simultaneous operations by a plurality of users matches the rhythm of music in a music game or the like. This configuration can provide enjoyment of a music experience.

Figure 15:
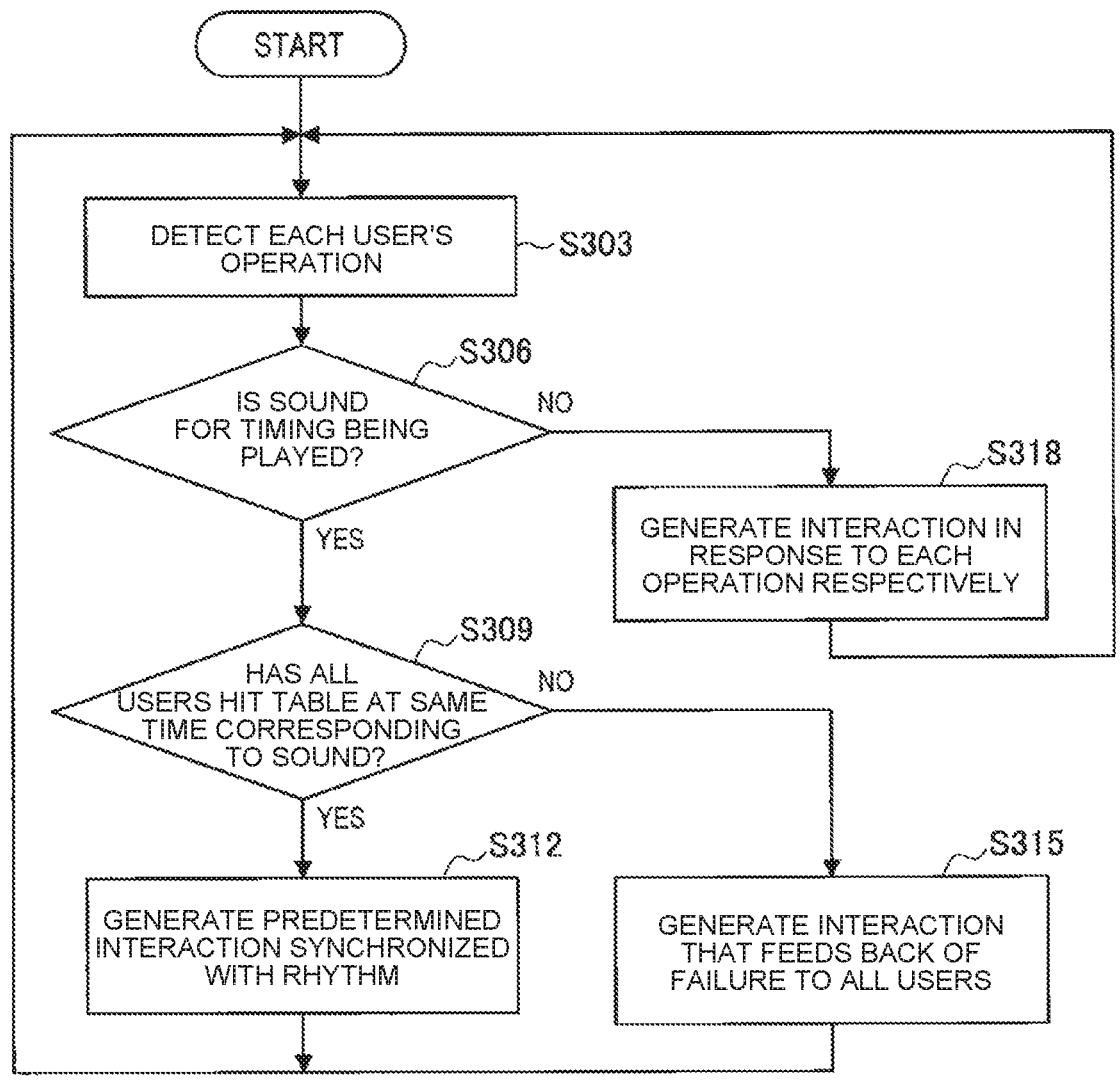
FIG. 15 is a flowchart illustrating an example of operation processing according to a third specific example executed by the information processing system according to the present embodiment.

FIG. 15 is a flowchart illustrating an example of operation processing according to the third specific example. As illustrated in FIG. 15, first, the information processing system 100 detects each user's operation (step S303).

Next, when a sound for matching timing is being reproduced (step S306/Yes), the information processing system 100 determines whether all of the players have simultaneously hit the table according to the sound (step S309). In a music game or the like, for example, the information processing system 100 plays music from the output unit 130 and detects an operation of each user based on a captured image input from the input unit 110, and the control unit 120 determines whether or not all the users have performed a predetermined operation such as hitting the table simultaneously with the timing of the sound.

Next, when it is determined that everyone has hit the table at the same time with the sound (step S309/Yes), the information processing system 100 generates a predetermined interaction synchronized with the rhythm of the sound being played (step S312). An example of the interaction will be described later with reference to FIG. 17.

On the other hand, when it is determined that all of the players are not hitting the table at the same time in accordance with the sound (which is failure) (step S309/No), the information processing system 100 generates an interaction that feeds back the failure to all users (Step S315). Examples of the feedback will be described later with reference to FIG. 19. Note that, as an example, an explanation has been given of generating an interaction that feeds back the failure to all users, however, the present embodiment is not limited to this example, and no interaction may be generated in a case of failure.

In addition, when the detected user operation is not an operation of hitting the table with both hands (step S306/No), the information processing system 100 generates an interaction corresponding to each operation individually (in each display object) (Step S318). More specifically, the interaction may be a normal interaction for moving, enlarging/reducing, and clearing individual display objects.

(Examples of Interaction)

Figure 16:
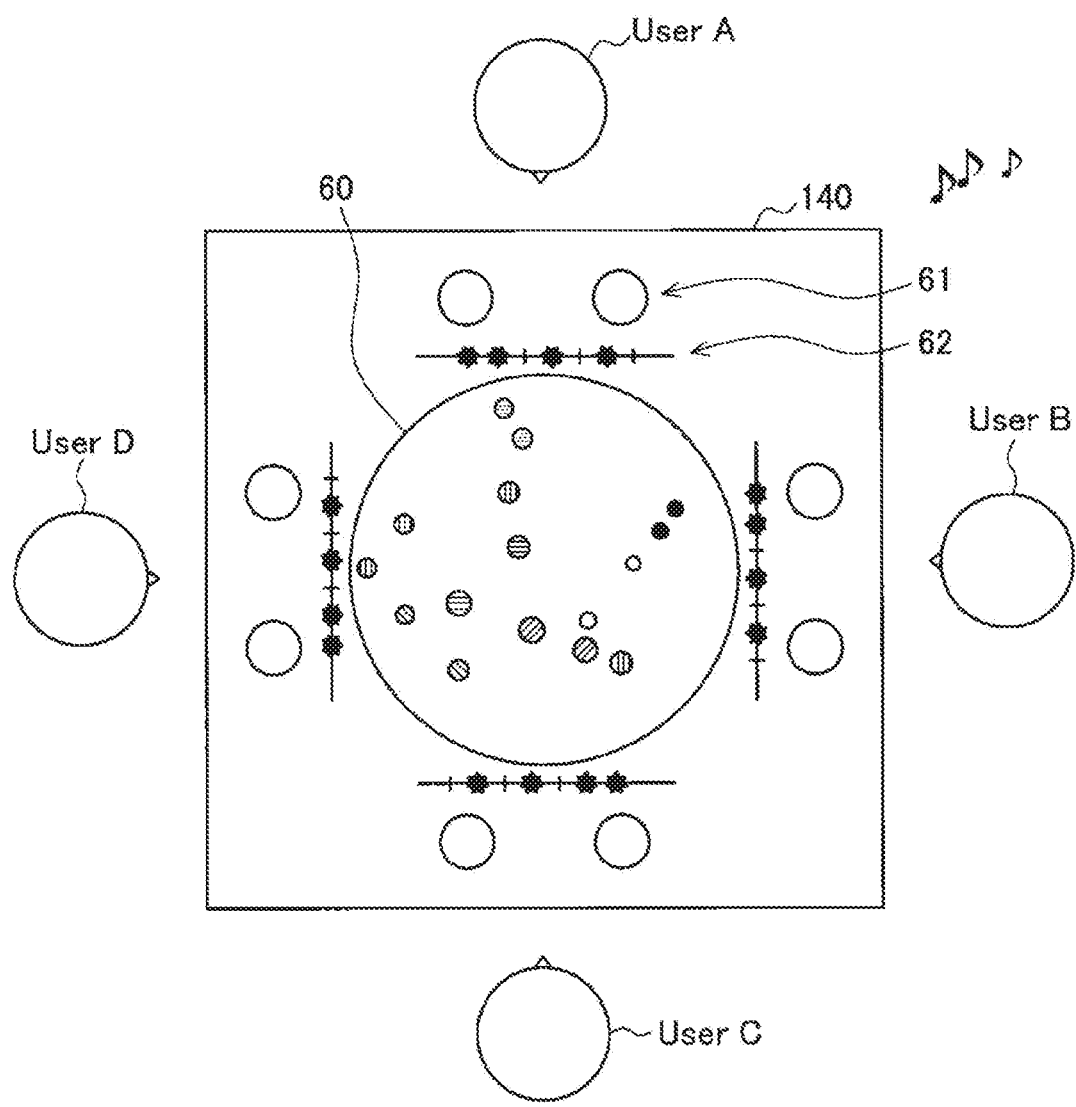
FIG. 16 is a diagram illustrating an example of a screen displayed on a table during a music experience according to the third specific example.

Here, an example of the interaction during music playback will be described with reference to FIGS. 16 to 19. FIG. 16 is a diagram illustrating an example of a screen displayed on the table 140 during the music experience.

As illustrated in FIG. 16, for example, a feedback display area 60, an operation unit 61, and a timing guide 62 are displayed on the table 140. In the feedback display area 60, various feedbacks are displayed according to user operations. The operation unit 61 is a display indicating a place where the user hits on the table 140. The timing guide 62 is a display that clearly show the user the timing of taking a rhythm, and for example, a sign may flow from left to right corresponding to music, and may be hit when the mark reaches a predetermined location. The display example and layout illustrated in FIG. 16 are examples, and the present embodiment is not limited to the examples. For example, the operation unit 61 may not be provided, and the feedback display area 60 may be the entire display surface.

Figure 17:
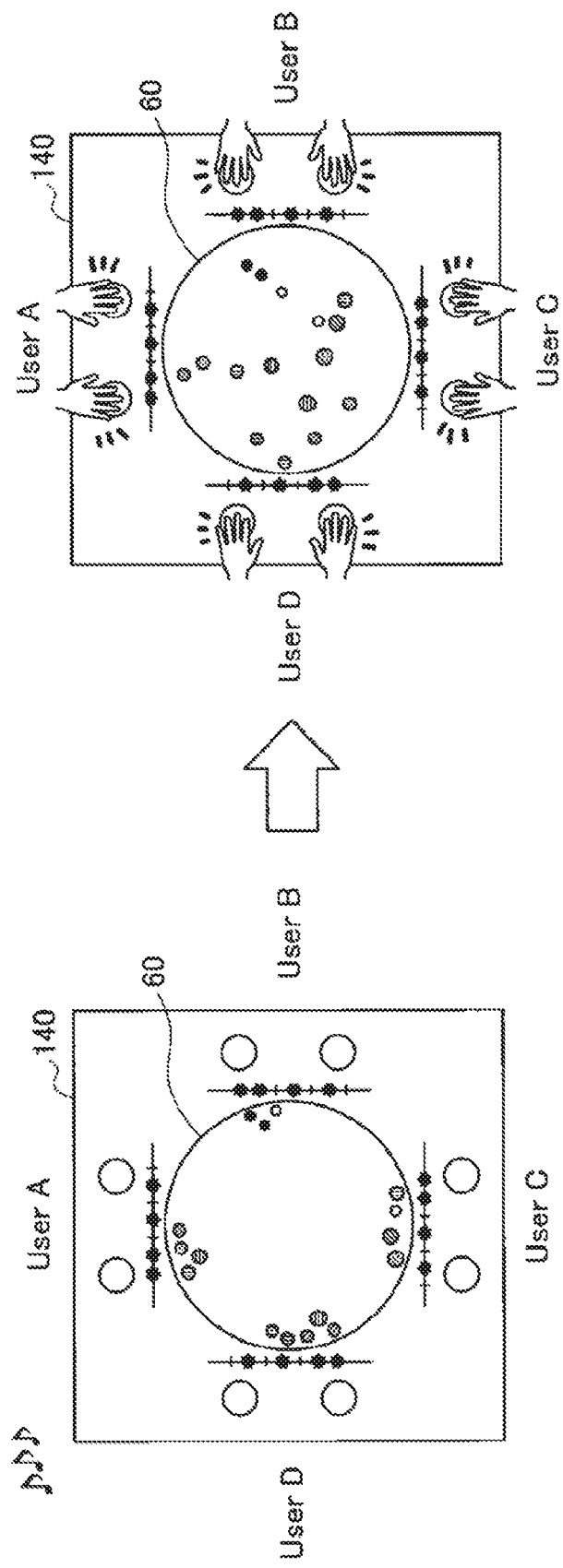
FIG. 17 is a diagram illustrating an example of an interaction in response to simultaneous operation performed by all users according to the third specific example.

FIG. 17 is a diagram illustrating an example of an interaction according to a simultaneous operation performed by all users according to the third specific example. As illustrated in the left of FIG. 17, for example, when user A, user B, user C, and user D surround the table 140, as illustrated in the right of FIG. 17, and the all users perform an operation of hitting the operation unit 61 with both hands at the same time, display control is performed in which a large number of balls displayed in the feedback display area 60 start moving or the moving speed is increased. This configuration can enhance the correctness of the accuracy of the rhythm to be hit by everyone and the sense of unity of the users who are present.

Note that the interaction corresponding to the user operation illustrated in FIG. 17 is an example, and the present embodiment is not limited to this example. Further, the interaction corresponding to the user operation may be reflected on the operation unit 61. Hereinafter, a description will be given with reference to FIG. 18.

Figure 18:
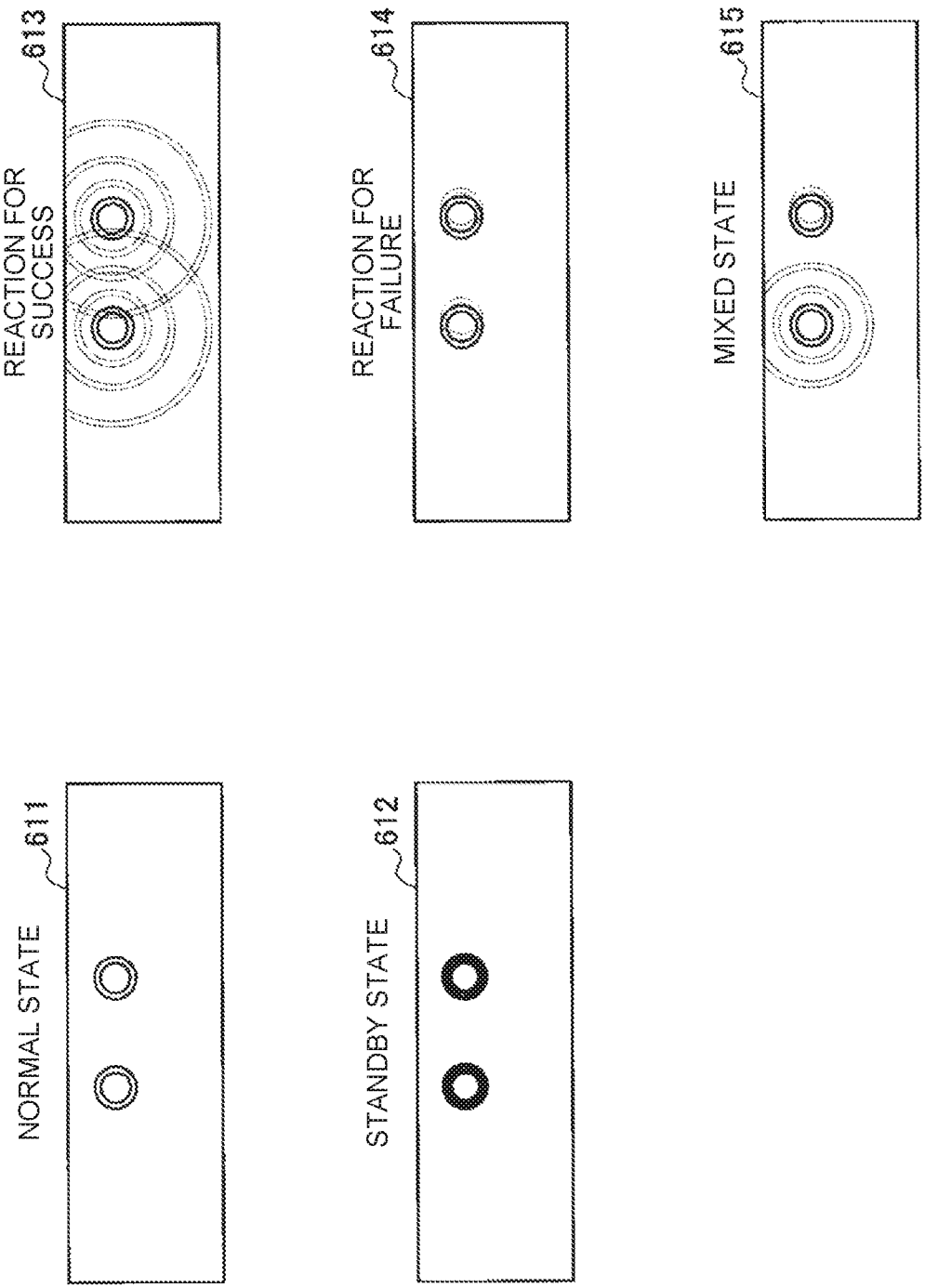
FIG. 18 is a diagram illustrating examples of interactions in an operation unit included in the display screen illustrated in FIG. 16.

FIG. 18 is a diagram illustrating an example of the interaction in the operation unit 61 displayed on the table 140. For example, in the "normal state", double circles are displayed as illustrated in the display 611 in FIG. 18. In this state, no interaction occurs by hitting or the like. Further, in the "standby state" in which there is some kind of reaction in response to hitting, colored double circles are displayed as illustrated in a display 612 in FIG. 18.

Also, in a case where the tapping operation is successful (a case where tapping is performed correctly in time with the rhythm), an interaction that spreads ripples may be displayed as illustrated in the display 613 in FIG. 18 to notify the user that the system has regarded the operation as successful. On the other hand, in a case where the tapping operation fails (a case where tapping is not performed correctly in time with the rhythm), an interaction that shakes double circles to left and right may be displayed as illustrated in the display 614 in FIG. 18 to notify the user that the system has regarded the operation as failure.

Further, as illustrated in the display 615 in FIG. 18, a decoded state including success in one side and failure in the other side may be displayed. With this configuration, the user can recognize which hand did not meet the timing.

Figure 19:
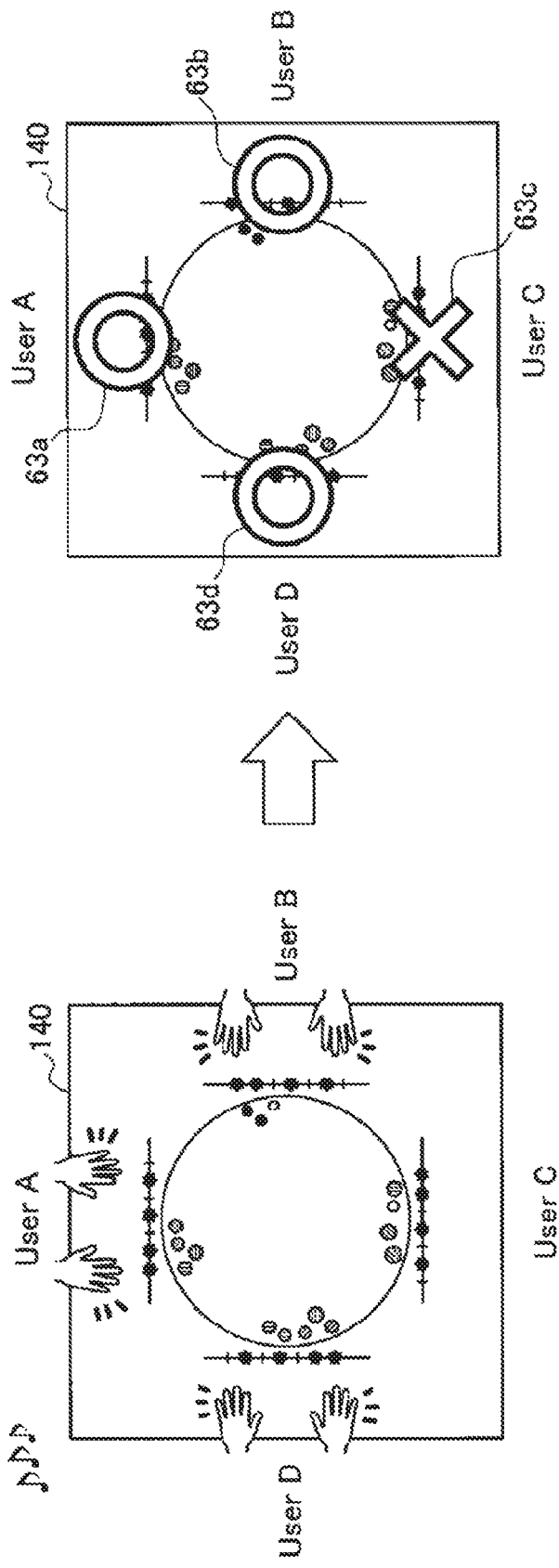
FIG. 19 is a diagram illustrating an example of feedback when simultaneous operation performed by all users according to the third specific example fails.

FIG. 19 is a diagram illustrating an example of feedback when the simultaneous operation performed by all users according to this specific example fails. As illustrated on the left side of FIG. 19, for example, in a case where user A, user B, user C, and user D surround table 140, and all the user perform an operation of tapping the table 140 with both hands according to music, and only the timing of the operation by user D does not much, the information processing system 100 regards the operation as "failure". At this time, as illustrated on the right side of FIG. 19, displays such as a circle or a cross may be fed back to the user to notify whose timing has not been met. In the example illustrated on the right side of FIG. 19, circle displays 63a, 63b, and 63d are displayed near user A, user B, and user D whose timings have met, and a cross display 63c is displayed near user C whose timing has not met.

Alternatively, the information processing system 100 may display a specific color (for example, red) only at the user's hand that has not met the timing.

In the above, an example of the interaction when everyone performs the same operation at a predetermined timing according to music has been described. Note that the display screen example according to this specific example is not limited to the example illustrated in FIG. 16 and for example, in a case where music that is played when a large number of users are working with a large number of display objects displayed on the table 140 and all the users perform the same predetermined operation at the same timing according to the rhythm of the music, the information processing system 100 may generate some kind of interaction that acts on the all display objects.

Further, the interaction according to this example may occur even when there is only one user.

In addition, embodiments in which the first to third specific examples described above are appropriately combined are naturally included in the scope of the present disclosure. For example, in the first specific example, when the operation timings of all the users do not match and the information processing system side regards the operation as a failure, an interaction that feeds back the user that the operation is failed may be generated as described in the second specific example with reference to FIG. 19.

<<5. Hardware Configuration Example>

Figure 20:
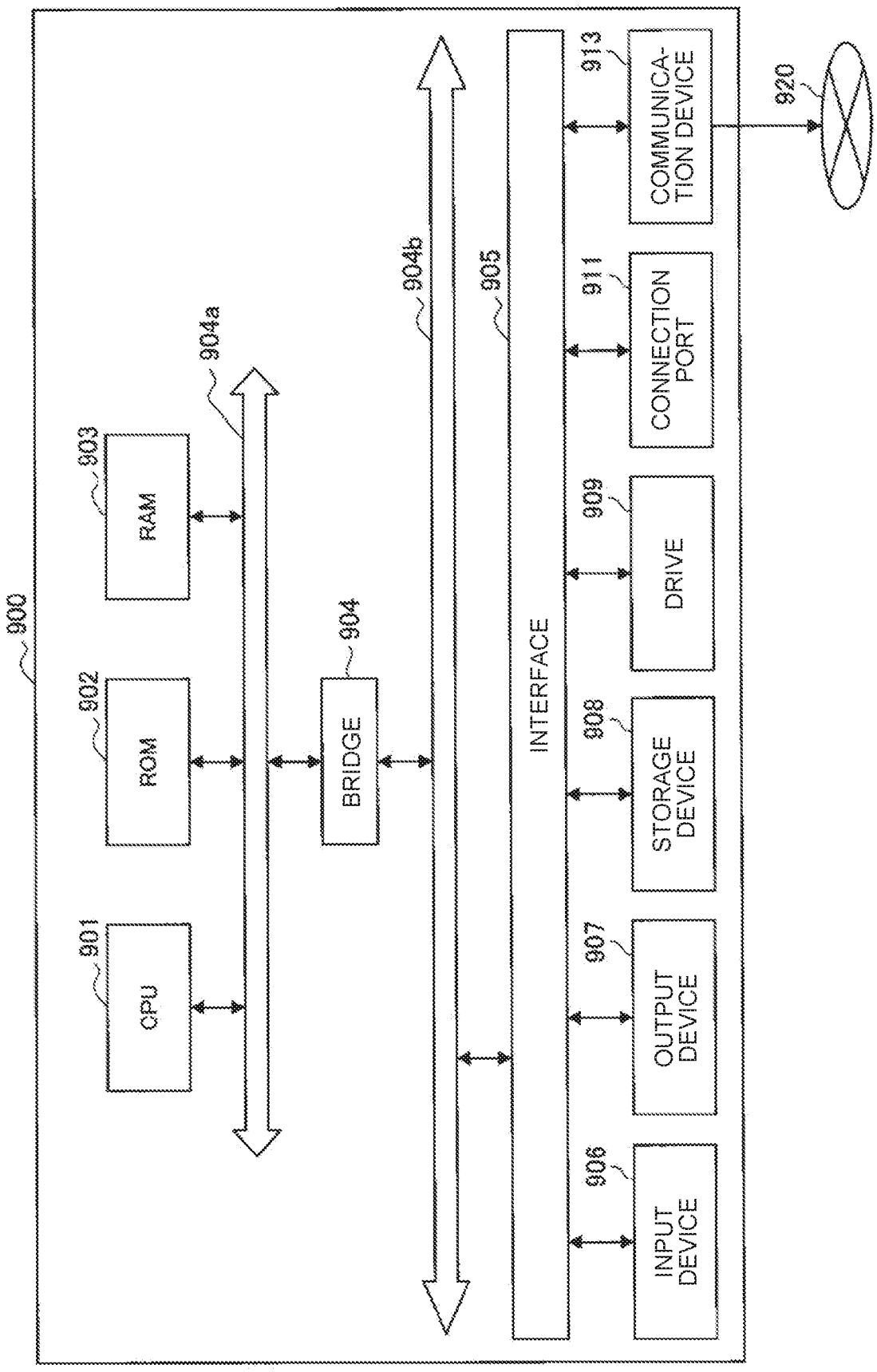
FIG. 20 is a block diagram illustrating an example of a hardware configuration of the information processing apparatus according to the present embodiment.

Finally, a hardware configuration of an information processing apparatus according to the present embodiment will be described with reference to FIG. 20. FIG. 20 is a block diagram illustrating an example of a hardware configuration of the information processing apparatus according to the present embodiment. Note that an information processing apparatus 900 illustrated in FIG. 20 can realize the information processing system 100 illustrated in FIGS. 1 to 4, for example. Information processing by the information processing system 100 according to the present embodiment is realized by cooperation between software and hardware described below.

As illustrated in FIG. 20, the information processing apparatus 900 includes a central processing unit (CPU) 901, a read only memory (ROM) 902, a random access memory (RAM) 903, and a host bus 904a. In addition, the information processing apparatus 900 includes a bridge 904, an external bus 904b, an interface 905, an input device 906, an output device 907, a storage device 908, a drive 909, a connection port 911, and a communication device 913. The information processing apparatus 900 may include a processing circuit such as an electric circuit, a DSP, or an ASIC in place of or in addition to the CPU 901.

The CPU 901 functions as an arithmetic processing device and a control device, and controls the overall operation in the information processing apparatus 900 according to various programs. Further, the CPU 901 may be a microprocessor. The ROM 902 stores programs, calculation parameters, and the like used by the CPU 901. The RAM 903 temporarily stores programs used in the execution of the CPU 901, parameters that change as appropriate during the execution, and the like. For example, the CPU 901 can form the control unit 120 illustrated in FIG. 4. For example, when the CPU 901 detects the same predetermined operation at the same timing by all users based on information input from the input device 906, the CPU 901 causes the output device 907 to generate one interaction that acts on all display objects.

The CPU 901, ROM 902 and RAM 903 are connected to each other by the host bus 904*a* including a CPU bus, and the like. The host bus 904*a* is connected to the external bus 904*b* such as a peripheral component interconnect/interface (PCI) bus via the bridge 904. Note that the host bus 904*a*, the bridge 904, and the external bus 904*b* are not necessarily configured separately, and these functions may be mounted on one bus.

The input device 906 is realized by a device to which information is input by the user, such as a mouse, a keyboard, a touch panel, a button, a microphone, a switch, a lever, and the like. Further, the input device 906 may be, for example, a remote control device that uses infrared rays or other radio waves, or may be an external connection device such as a mobile phone or a PDA that supports the operation of the information processing apparatus 900. Furthermore, the input device 906 may include, for example, an input control circuit that generates an input signal based on information input by the user using the above input means and outputs the input signal to the CPU 901. A user of the information processing apparatus 900 can input various data and instruct a processing operation to the information processing apparatus 900 by operating the input device 906. Alternatively, the input device 906 can be formed by a device that detects information about the user. For example, the input device 906 includes various sensors such as an image sensor (for example, a camera), a depth sensor (for example, a stereo camera), an acceleration sensor, a gyro sensor, a geomagnetic sensor, an optical sensor, a sound sensor, a distance sensor, a force sensor, and the like. Further, the input device 906 may acquire information related to a state of the information processing apparatus 900 itself such as a posture, a moving speed, or the like of the information processing apparatus 900, or information related to environment of the information processing apparatus 900 such as brightness, noise, or the like around the information processing apparatus 900. Further, the input device 906 may include a GNSS module that receives a GNSS signal from a global navigation satellite system (GNSS) satellite (for example, a GPS signal from a Global Positioning System (GPS) satellite), and measures position information including the latitude, longitude, and altitude of the device. Further, regarding the position information, the input device 906 may detect the position by transmitting/receiving with Wi-Fi (registered trademark), a mobile phone, a PHS, a smartphone, or the like, or short-range communication. The input device 906 can form, for example, the input unit 110 illustrated in FIGS. 1 to 4. In the present embodiment, the input device 906 receives information regarding the arrangement of users, number of users, operations by the users, and real objects on the display screen.

The output device 907 is formed of a device capable of visually or audibly notifying acquired information to the user. As such a device, there may be a display device including a CRT display device, a liquid crystal display device, a plasma display devices, an EL display device, a laser projector, an LED projectors and lamps, or the like, an audio output device including a speaker and headphones, or the like, a printer device, and the like. The output device 907 outputs results obtained by various processes performed by the information processing apparatus 900, for example. More specifically, the display device visually displays the results obtained by various processes performed by the information processing apparatus 900 in various formats such as text, images, tables, graphs, and the like. On the other hand, the audio output device converts an audio signal composed of reproduced audio data, acoustic data, and the like into an analog signal and outputs the signal aurally. The output device 907 can form, for example, the output unit 130 illustrated in FIGS. 1 to 4. According to the present embodiment, the output device 907 performs display for rotating or raising all display objects, and the like based on control by the CPU 901.

The storage device 908 is a data storage device formed as an example of a storage unit of the information processing apparatus 900. The storage device 908 is realized by, for example, a magnetic storage device such as an HDD, a semiconductor storage device, an optical storage device, a magneto-optical storage device, or the like. The storage device 908 may include a storage medium, a recording device that records data on the storage medium, a reading device that reads data from the storage medium, a deletion device that deletes data recorded on the storage medium, and the like. The storage device 908 stores programs executed by the CPU 901, various data, various data acquired from the outside, and the like. The storage device 908 can form, for example, the storage unit 150 illustrated in FIG. 4.

The drive 909 is a storage medium reader/writer, and is built in or externally attached to the information processing apparatus 900. The drive 909 reads information recorded on a removable storage medium such as a mounted magnetic disk, optical disk, magneto-optical disk, or semiconductor memory, and outputs the information to the RAM 903. Further, the drive 909 can also write information on a removable storage medium.

The connection port 911 is an interface connected to an external device, and is a connection opening with an external device capable of transmitting data by, for example, Universal Serial Bus (USB).

The communication device 913 is a communication interface formed by a communication device or the like for connecting to a network 920, for example. The communication device 913 is, for example, a communication card for wired or wireless local area network (LAN), Long Term Evolution (LTE), Bluetooth (registered trademark), or Wireless USB (WUSB). Further, the communication device 913 may be an optical communication router, an asymmetric digital subscriber line (ADSL) router, various communication modems, or the like. The communication device 913 can transmit and receive signals and the like according to a predetermined protocol such as TCP/IP, for example, with the Internet and other communication devices.

Note that the network 920 is a wired or wireless transmission path for information transmitted from a device connected to the network 920. For example, the network 920 may include a public line network such as the Internet, a telephone line network, and a satellite communication network, various local area networks (LANs) including Ethernet (registered trademark), a wide area network (WAN), and the like. Further, the network 920 may include a dedicated line network such as Internet Protocol-virtual private network (IP-VPN) and the like.

In the above, an example of the hardware configuration capable of realizing the functions of the information processing apparatus 900 according to the present embodiment has been described. Each of the above components may be realized using a general-purpose member, or may be realized by hardware specialized for the function of each component. Therefore, the hardware configuration to be used may be changed as appropriate according to the technical level at the time of carrying out the present embodiment.

Note that it is possible to create a computer program for realizing each function of the information processing apparatus 900 according to the present embodiment as described above and mount the computer program on a PC or the like. In addition, a computer-readable recording medium storing such a computer program can be provided. The recording medium is, for example, a magnetic disk, an optical disk, a magneto-optical disk, a flash memory, or the like. Further, the above computer program may be distributed via a network for example, without using a recording medium.

<<6. Summary>>

As described above, in the information processing system according to the embodiment of the present disclosure, specific feedback can be provided on the display image with respect to a predetermined operation in which the timings of a plurality of users are matched.

The preferred embodiments of the present disclosure have been described in detail above with reference to the accompanying drawings, but the present technology is not limited to such examples. It is obvious that a person having ordinary knowledge in the technical field of the present disclosure can come up with various changes or modifications within the scope of the technical idea described in the claims and it is surely understood that it belongs to the technical scope of the present disclosure.

For example, it is possible to create a computer program for causing hardware such as CPU, ROM, and RAM incorporated in each configuration included in the information processing system 100 described above to perform the functions of each configuration included in the information processing system 100. A computer-readable storage medium storing the computer program is also provided.

Further, the effects described in the present specification are merely illustrative or exemplary and are not limited. That is, the technology according to the present disclosure can exhibit other effects that are apparent to those skilled in the art from the description of the present specification in addition to or instead of the above effects.

Note that the present technology can also have the following configurations.

(1)

An information processing apparatus comprising a control unit configured to:

recognize a plurality of users;

detect operation, by each user, on a display surface where an image is being displayed; and control to output feedback on the image displayed on the display surface according to timing of detected operations by the plurality of users.

(2)

The information processing apparatus according to (1), wherein the control unit outputs a predetermined feedback that acts on all images displayed on the display surface in a case where the detected operations by the plurality of users are all the same and are performed at the same time.

(3)

The information processing apparatus according to (2), wherein the all images displayed on the display surface include a display object and a background image.

(4)

The information processing apparatus according to (3), wherein the operation is an operation onto a no-display-object region.

(5)

The information processing apparatus according to any one of (2) to (4), wherein the plurality of users are all users existing around the display surface.

(6)

The information processing apparatus according to any one of (2) to (5), wherein the plurality of users are all users who are operating onto the display surface.

(7)

The information processing apparatus according to any one of (2) to (6), wherein the plurality of users are all operating users who exist around the display surface and meet a predetermined condition.

(8)

The information processing apparatus according to any one of (2) to (7), wherein as the predetermined feedback that acts on the all images displayed on the display surface, the control unit performs display control that rotates the all images about a center of the display surface.

(9)

The information processing apparatus according to (8), wherein the rotation angle is changed according to a number of the plurality of users and an arrangement of the plurality of users.

(10)

The information processing apparatus according to (8) or (9), wherein the rotation angle is changed according to a shape of the display surface.

(11)

The information processing apparatus according to any one of (2) to (7), wherein as the predetermined feedback that acts on the all images displayed on the display surface, the control unit performs display control that clears the all images.

(12)

The information processing apparatus according to any one of (2) to (7), wherein as the predetermined feedback that acts on the all images displayed on the display surface, the control unit performs display control that temporarily moves the all images.

(13)

The information processing apparatus according to (12), wherein the control unit performs the display control to display a ripple spreading on a water surface or a water flow on the display surface and the all images are shaken corresponding to the ripple on the water surface or the water flow.

(14)

The information processing apparatus according to (13), wherein the control unit performs display control in which the ripple on the water surface or the water flow spread on the display surface avoids a real object placed on the display surface.

(15)

The information processing apparatus according to any one of (2) to (14), wherein in a case where timings of the detected operations by the plurality of users do not much, the control unit starts to rotate the all images about the center of the display surface once and put the images back.

(16)

The information processing apparatus according to any one of (2) to (15), wherein in a case where the predetermined same simultaneous operations performed by the plurality of users are performed at predetermined timing corresponding to played music, the control unit outputs the predetermined feedback that acts on the all images displayed on the display surface.

(17)

The information processing apparatus according to (16), wherein in a case where timing of operation by at least one of the plurality of users is not the predetermined timing corresponding to the music, the control unit determines that the operation is failed and outputs a display on the display surface to notify the plurality of users of the operation failure.

(18)

An information processing method, wherein a processor executes processes comprising:

recognizing a plurality of users;

detecting operation, by each user, on a display surface where an image is being displayed; and outputting feedback on the image displayed on the display surface according to timing of detected operations by the plurality of users.

(19)

A program that causes a computer to function as a control unit for:

recognizing a plurality of users;

detecting operation, by each user, on a display surface where an image is being displayed; and outputting feedback on the image displayed on the display surface according to timing of detected operations by the plurality of users.

REFERENCE SIGNS LIST

100 Information processing system
100a Information processing system
100b Information processing system
100c Information processing system
110 Input unit
110a Input unit
110b Input unit
110c Input unit
120 Control unit
121 User recognition unit
123 Multi-user operation detection unit
125 Display control unit
130 Output unit
130a Output unit
130b Output unit
130c Output unit
140 Table
140a Table
140b Table
150 Storage unit

The invention claimed is:

1. An information processing apparatus, comprising:
a control unit configured to:
determine a shape of a display surface, wherein the display surface displays a plurality of images;
recognize a plurality of users around the display surface;
detect an operation, by each user of the plurality of users, on the display surface;
detect that the operation performed by each user of the plurality of users is same and is performed at a same time;
control to output, based on the detection that the operation performed by each user of the plurality of users is same and is performed at the same time, a specific feedback on the plurality of images displayed on the display surface; and perform, based on the specific feedback, a display control that rotates the plurality of images about a center on the display surface, wherein
the plurality of images is rotated by a specific rotation angle, and
the specific rotation angle is based on the shape of the display surface.

2. The information processing apparatus according to claim 1, wherein each of the plurality of images includes a display object and a background image.

3. The information processing apparatus according to claim 2, wherein the operation is performed onto a no-display-object region on the display surface.

4. The information processing apparatus according to claim 1, wherein the plurality of users operates onto the display surface.

5. The information processing apparatus according to claim 1, wherein each of the plurality of users is an operating user and meets a specific condition.

6. The information processing apparatus according to claim 1, wherein the specific rotation angle is changed based on a number of the plurality of users and an arrangement of the plurality of users.

7. The information processing apparatus according to claim 1, wherein the control unit is further configured to perform, based on the specific feedback, the display control that clears the plurality of images.

8. The information processing apparatus according to claim 1, wherein the control unit is further configured to perform, based on the specific feedback, the display control that temporarily moves the plurality of images.

9. The information processing apparatus according to claim 8, wherein
the control unit is further configured to perform the display control to display one of a ripple on a water surface or a water flow on the display surface, and
the plurality of images is shaken corresponding to one of the ripple on the water surface or the water flow.

10. The information processing apparatus according to claim 9, wherein the control unit is further configured to perform the display control in which one of the ripple on the water surface or the water flow on the display surface avoids a real object placed on the display surface.

11. The information processing apparatus according to claim 1, wherein in a case where timing of the detected operation performed by each user of the plurality of users does not match, the control unit is further configured to:
rotate the plurality of images about the center of the display surface once; and
put the plurality of images back after the rotation.

12. The information processing apparatus according to claim 1, wherein the control unit is further configured to:
determine whether the operation performed by each user of the plurality of users is same and is performed at the same time which corresponds to a timing of a played music; and
control to output, based on the determination, the specific feedback that acts on the plurality of images displayed on the display surface.

13. The information processing apparatus according to claim 12, wherein the control unit is further configured to:
determine that a timing of the operation by at least one user of the plurality of users is different from the timing of the played music;

determine an operation failure based on the determination that the timing of the operation by the at least one user of the plurality of users is different from the timing of the played music; and perform, based on the operation failure, the display control that notifies the plurality of users of the operation failure on the display surface.

14. An information processing method, comprising:

determining, by a processor, a shape of a display surface, wherein the display surface displays a plurality of images;

recognizing, by the processor, a plurality of users around the display surface;

detecting, by the processor, an operation by each user of the plurality of users on the display surface;

detecting, by the processor, that the operation performed by each user of the plurality of users is same and is performed at a same time;

outputting, by the processor, based on the detection that the operation performed by each user of the plurality of users is same and is performed at the same time, a specific feedback on the plurality of images displayed on the display surface; and performing, by the processor, based on the specific feedback, a display control that rotates the plurality of images about a center on the display surface, wherein
the plurality of images is rotated by a specific rotation angle, and
the specific rotation angle is based on the shape of the display surface.

15. A non-transitory computer-readable medium having stored thereon, computer-executable instructions which, when executed by a computer, cause the computer to execute operations, the operations comprising:

determining a shape of a display surface, wherein the display surface displays a plurality of images;

recognizing a plurality of users around the display surface;

detecting an operation, by each user of the plurality of users, on the display surface;

detecting that the operation performed by each user of the plurality of users is same and is performed at a same time;

outputting, based on the detection that the operation performed by each user of the plurality of users is same and is performed at the same time, a specific feedback on the plurality of images displayed on the display surface; and performing, based on the specific feedback, a display control that rotates the plurality of images about a center on the display surface, wherein
the plurality of images is rotated by a specific rotation angle, and
the specific rotation angle is based on the shape of the display surface.

* * * * *